(12) United States Patent
Seki et al.

(10) Patent No.: US 10,717,343 B2
(45) Date of Patent: Jul. 21, 2020

(54) HEATING DEVICE

(71) Applicant: DENSO CORPORATION, Kariya, Aichi-pref. (JP)

(72) Inventors: Hideki Seki, Kariya (JP); Kimitake Ishikawa, Kariya (JP); Yasuhiro Sagou, Kariya (JP); Toshinori Ochiai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 68 days.

(21) Appl. No.: 15/319,390

(22) PCT Filed: Jul. 27, 2015

(86) PCT No.: PCT/JP2015/003743
§ 371 (c)(1),
(2) Date: Dec. 16, 2016

(87) PCT Pub. No.: WO2016/017137
PCT Pub. Date: Feb. 4, 2016

(65) Prior Publication Data
US 2017/0144507 A1 May 25, 2017

(30) Foreign Application Priority Data
Aug. 1, 2014 (JP) .................................. 2014-157948

(51) Int. Cl.
*B60H 1/22* (2006.01)
*B60K 37/00* (2006.01)
(Continued)

(52) U.S. Cl.
CPC ....... *B60H 1/2225* (2013.01); *B60H 1/00292* (2013.01); *B60H 1/00535* (2013.01);
(Continued)

(58) Field of Classification Search
CPC .............. B60H 1/00535; B60H 1/2221; B60H 1/2225; B60H 2001/2293; B60H 1/2215;
(Continued)

(56) References Cited

U.S. PATENT DOCUMENTS 3,885,126 A * 5/1975 Sugiyama ............ B60H 1/0025
392/485
4,401,013 A * 8/1983 Ohashi ............... B60H 1/00007
165/42
(Continued)

FOREIGN PATENT DOCUMENTS

JP    S53 7006 U    1/1978
JP    S56 116261 U  9/1981
(Continued)

*Primary Examiner* — Alex M Valvis
(74) *Attorney, Agent, or Firm* — Harness Dickey & Pierce, P.L.C.

(57) ABSTRACT

A heater device has a heater body and a heater case. The heater body has a heat generating part generating heat and radiates the heat supplied from the heat generating part. The heater case is attached to an interior member provided in an interior and houses the heater body, such that an interior-side surface of the heater body is located on a back side of the interior member. The heater case is provided with a ventilation passage through which a space outside the heater case located on the back side of the interior member communicates with the interior-side surface of the heater body.

15 Claims, 12 Drawing Sheets

(51) Int. Cl.
*B60H 1/00* (2006.01)
*H05B 3/24* (2006.01)
*F24H 3/04* (2006.01)
*F24D 3/16* (2006.01)
*H05B 3/06* (2006.01)
*B62D 25/14* (2006.01)

(52) U.S. Cl.
CPC ......... *B60H 1/2215* (2013.01); *B60H 1/2221* (2013.01); *B60H 1/2226* (2019.05); *B60K 37/00* (2013.01); *F24D 3/16* (2013.01); *F24H 3/0429* (2013.01); *H05B 3/06* (2013.01); *H05B 3/24* (2013.01); *B60H 2001/2287* (2013.01); *B62D 25/14* (2013.01); *H05B 2203/032* (2013.01)

(58) Field of Classification Search
CPC ....... B60H 1/2226; B60H 1/2227; F24D 3/16; H05B 3/06; B62D 25/14
USPC ............. 219/202, 204; 165/41–43, 202–204; 454/159–161; 62/239, 244
See application file for complete search history.

(56) References Cited

U.S. PATENT DOCUMENTS

| | | | | |
|---|---|---|---|---|
| 4,562,957 A | * | 1/1986 | Nakagawa | B60H 1/00292 219/202 |
| 4,679,730 A | * | 7/1987 | Uchida | B60H 1/00471 237/12.3 A |
| 5,206,476 A | * | 4/1993 | Fresch | B60H 1/2225 219/202 |
| 7,581,785 B2 | * | 9/2009 | Heckmann | B60H 1/00407 297/180.12 |
| 2005/0178755 A1 | * | 8/2005 | Ulbrich | B60H 1/00285 219/202 |
| 2007/0295706 A1 | * | 12/2007 | Brun | B60H 1/2225 219/202 |
| 2008/0036249 A1 | * | 2/2008 | Heckmann | B60H 1/00407 297/180.13 |
| 2010/0176110 A1 | * | 7/2010 | Ogino | B60H 1/00271 219/202 |
| 2012/0061365 A1 | * | 3/2012 | Okamoto | B60H 1/2225 219/202 |

FOREIGN PATENT DOCUMENTS

| | | |
|---|---|---|
| JP | S56 116264 U | 9/1981 |
| JP | S57 57156 U | 4/1982 |
| JP | S60 191813 A | 9/1985 |
| JP | S62 15076 U | 1/1987 |
| JP | H04159124 A | 6/1992 |
| JP | H05139146 A | 6/1993 |
| JP | H09303803 A | 11/1997 |
| JP | 2003343867 | 12/2003 |
| JP | 2004061046 A | 2/2004 |
| JP | 2010111250 A | 5/2010 |
| JP | 2010111251 A | 5/2010 |
| JP | 2014015139 A | 1/2014 |
| JP | 2015016703 A | 1/2015 |
| JP | 2016034791 A | 3/2016 |
| JP | 2016035352 A | 3/2016 |

* cited by examiner

HEATING DEVICE

CROSS REFERENCE TO RELATED APPLICATIONS

This application is a U.S. National Phase application under 35 U.S.C. 371 of International Application No. PCT/JP2015/003743 filed on Jul. 27, 2015 and published in Japanese as WO 2016/017137 A1 on Feb. 4, 2016. This application is based on and claims the benefit of priority from Japanese Patent Application No. 2014-157948 filed on Aug. 1, 2014. The entire disclosures of all of the above applications are incorporated herein by reference.

TECHNICAL FIELD

The present disclosure relates to a heating device that warms a person in an interior.

BACKGROUND ART

Patent Literature 1 discloses an embodiment of a heater device that forms a flat heat generating element. The flat heat generating element described in Patent Literature 1 is disposed to an interior member of a vehicle so as to surround the sides and upper parts of the feet of an occupant. In the heater device, the surface temperature of a side cover to which a side heater is disposed is controlled so as to be lower than the surface temperature of an upper heater to which an upper cover is disposed.

PRIOR ART LITERATURES

Patent Literature

Patent Literature 1: JP 2010-111251 A

SUMMARY OF INVENTION

According to the studies by the inventors of the present disclosure, in the heater device of Patent Literature 1, not only heat radiated from the heat generating element toward an interior is supplied to the body of an occupant located opposite the heat generating element, but also some of the heat may convect along an interior member without flowing toward the occupant and consequently transfer to the surroundings. A heat radiation path where convection occurs along an interior member on the interior side may thermally affect devices arranged around the heater device because surrounding interior members are heated from the interior side. For example, an accurate interior temperature may not be detected since a temperature sensor detecting an interior temperature is heated when a heat radiated by the heater device is transferred to the temperature sensor through the above-described heat radiation path. This abnormality becomes significant when such a temperature sensor is located in a place where warm air is easily transferred to the heater device, for example, in a place higher in height than the heater device.

The present disclosure is made in view of the foregoing matters. Therefore, it is an object of the present disclosure to provide a heating device that restricts heated air to be supplied into an interior from flowing along an internal member and thus reduces thermal effect on the surroundings.

A heater device has a heater body and a heater case. The heater body has a heat generating part generating heat and radiates the heat supplied from the heat generating part. The heater case is attached to an interior member provided in an interior and houses the heater body, such that an interior-side surface of the heater body is located on a back side of the interior member. The heater case is provided with a ventilation passage through which a space outside the heater case located on the back side of the interior member communicates with the interior-side surface of the heater body.

According to the present disclosure, the heater body is arranged such that the interior-side surface is located on the back side of the interior member. Furthermore, the heater case is provided with the ventilation passage through which a space outside the heater case and the interior-side surface of the heater body communicate with each other. Thus, some of heat radiated from the interior-side surface of the heater body toward the interior is expelled through the ventilation passage onto the space outside the heater case, that is, the back side of the interior member. Accordingly, air heated by the heat radiation from the heater body is prevented from flowing out upward along the surface of the interior member by means of natural convection. As described above, partial temperature rise in the periphery of the heating device, resulting from formation of warm air current due to natural convection can be prevented. Accordingly, it is possible to provide the heating device that is able to reduce thermal effect on peripheral devices and securely makes a user warm.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Embodiments of the present disclosure will be described hereinafter referring to drawings. In the embodiments, a part that corresponds to or equivalents to a matter described in a preceding embodiment may be assigned with the same reference number, and descriptions of the part may be omitted. When only a part of a configuration is described in an embodiment, parts described in preceding embodiments may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A heater device according to the present disclosure is a device mounted on an interior member in an interior. The heater device has a heat generating part, and heat radiated from the heat generating part is supplied into a vehicle interior by radiant heat and convection. Therefore, the heater device can also be a radiation heater device that can transfer radiant heat transmitted by heat rays from a high-temperature solid surface to a low-temperature solid surface regardless of the presence of, for example, air between the surfaces, or can be a heat-medium heater device that uses heat generated by a high-temperature medium. The heat-medium heater device can use, for example, warm water or a pressurized medium as a heat source. In the heater device according to the present disclosure, the energy source for generating heat is not limited, and any heat medium such as electricity or warm water can be used as an energy source.

The first embodiment will be described using an example where a radiation heater device 1 is used as a heater device that is a heating device used in an interior. The radiation heater device 1 is disposed, for example, in an interior of a movable body such as a vehicle that runs on a road, a ship, or an airplane, or in an interior of a building fixed on land. The radiation heater device 1 in the first embodiment will be described with reference to FIGS. 1 to 6.

Figure 1:
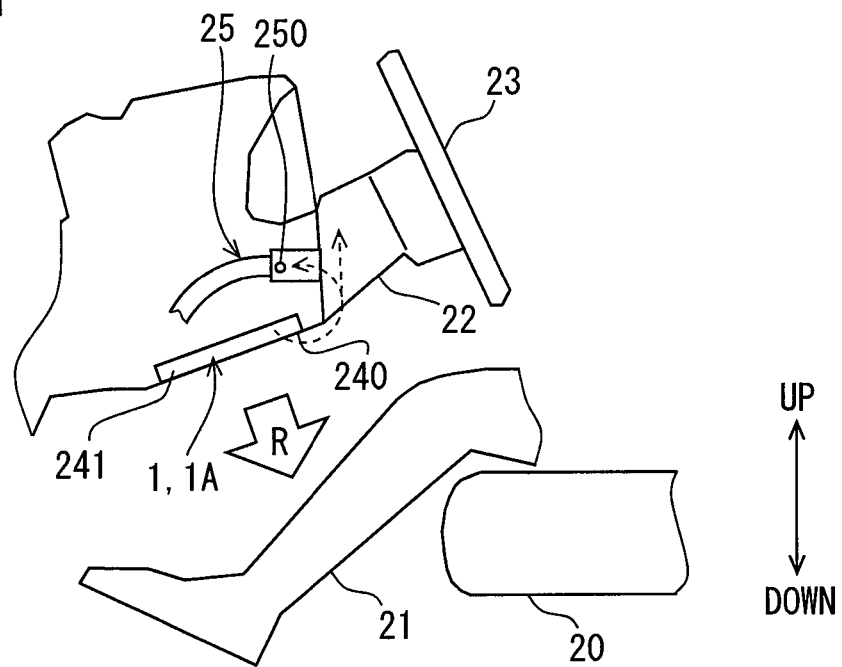
FIG. 1 is a diagram illustrating the positional relation between a radiation heater device, which is an example of a heating device according to the present disclosure, and an occupant.

In FIG. 1, the radiation heater device 1 or a warm-water type heater device 1A forms a heating device for a vehicle interior. The warm-water type heater device 1A has a heat generating element that has a hot-water passage where warm water is present, and supplies heat, which is radiated from the hot-water passage, toward an occupant 21 in the interior as heat for heating. The heat (i.e., radiant heat) R radiated from the device mainly reaches the occupant 21 by convection such as natural convection or forced convection by a fan. The heat generating element of the warm-water type heater device may be in the form of a panel or a plate, like a base plate 10 shown in FIG. 2. The heat generating element can be used, for example, when warm water is produced by electric energy, gas, other fuel, or the like, or when warm water is produced by a heat source such as an internal combustion engine, or when warm water used in another apparatus is reutilized.

In the following embodiments, a heating device that has the radiation heater device 1 in a vehicle interior will be described as an example of a heating device according to the present disclosure. The radiation heater device 1 is an electric type heater that generates heat by being supplied with power from a power source such as a battery or a dynamo mounted in a movable body. The radiation heater device 1 is formed in a plate shape. The radiation heater device 1 generates heat when supplied with electric power. In order to warm an object located in a direction perpendicular to the surface of the radiation heater device 1, the radiation heater device 1 radiates a radiant heat R mainly in a direction perpendicular to the surface.

A seat 20 for the occupant 21 to sit thereon is arranged in the interior. Hereinafter, the radiation heater device 1 may simply be referred to as a heater device 1. The heater device 1 is disposed in the interior such that the radiant heat R is radiated toward the feet of the occupant 21. The heater device 1 is arranged on a wall surface in the interior. The wall surface in the interior is, for example, an interior member such as an instrument panel, a door trim, or a ceiling, and forms an interior member for a vehicle. The heater device 1 is arranged to face the occupant 21 as the occupant is assumed to be in a typical posture. For example, a road traveling vehicle has a steering column 22 for supporting a steering wheel 23. Therefore, the heater device 1 can be arranged on the undersurface of the steering column 22, an instrument panel, a door trim, a ceiling, or the like, which is one example of the interior members, such that the heater device 1 opposes the occupant 21.

Figure 2:
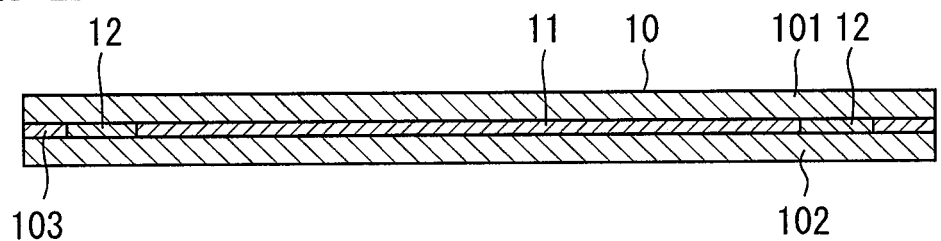
FIG. 2 is a sectional view illustrating a typical heater body according to the radiation heater device.

A sectional view in FIG. 2 shows an example of the configuration of a typical heater body relating to the heater device 1. The heater device 1 is formed in the shape of an approximately square thin plate. The heater device 1 has a base plate 10 that forms a heater body. The base plate 10 has heat generating parts 11 and a pair of terminals 12 which are conductive parts. The heater device 1 can also be referred to as a flat heater that radiates the radiant heat R mainly in a direction perpendicular to a surface. The base plate 10 forms the heater body including the heat generating parts 11 that generate heat by electric conduction.

The base plate 10 is made of a resin material with excellent electrical insulation and high temperature resistance. The base plate 10 may be, for example, a multilayer base plate. The base plate 10 has a front surface layer 101, a rear surface layer 102, and an intermediate layer 103. The front surface layer 101 faces the direction of radiation of the radiant heat R. The front surface layer 101 is a surface that is arranged opposite to a part of the body of the occupant 21 who is a target to be heated, on a condition that the heater device 1 is mounted. The rear surface layer 102 forms the back of the heater device 1. The intermediate layer 103 supports the heat generating part 11 and the terminals 12 on a condition of being interposed between the front surface layer 101 and the rear surface layer 102. The base plate 10 supports the heat generating parts 11, each of which is in linear form. The front surface layer 101, the rear surface layer 102, and the intermediate layer 103 are insulation parts made of a raw material lower in heat conductivity than the heat generating parts 11 and the terminals 12. The front surface layer 101, the rear surface layer 102, and the intermediate layer 103 may be made of, for example, polyimide resin.

Each of the heat generating parts 11 is made of a material that generates heat by electric conduction. The heat generating part 11 is made of a metal material such as copper, silver, tin, stainless steel, nickel, or nichrome. Each of the heat generating parts 11 is in linear or plate form parallel to the surfaces of the base plate 10. The heat generating parts 11 are separately arranged in the surface of the base plate 10. Alternatively, the heat generating parts 11 may be formed from a single linear body and may be disposed so as to spread over the entire base plate 10.

Each heat generating part 11 is connected to a pair of terminals 12 arranged with a specified interval in between. The heat generating parts 11 are interspatially provided between the pair of terminals 12. The heat generating parts 11 are connected in parallel to the pair of terminals 12 so as to connect the pair of terminals 12, and are provided over almost the entire surface of the base plate 10. The heat generating parts 11 are provided together with the intermediate layer 103 between the front surface layer 101 and the rear surface layer 102. The heat generating parts 11 are protected from the outside by the base plate 10. The front surface layer 101 and the rear surface layer 102 can be provided by printing or adhesion.

Each heat generating part 11 is a member that is thermally connected to at least the front surface layer 101 and generates heat by electric conduction. Thus, heat generated by the heat generating parts 11 is transferred to the front surface layer 101. Heat generated by one of the heat generating parts 11 is radiated to an outside of the front surface layer 101 as radiant heat via a member, for example, the base plate 10, and is transferred to the occupant 21 opposite the one heat generating part 11.

The heat generating parts 11 are set to have a specified length in order to obtain specified calorific power. Therefore, each heat generating part 11 is set to have specified resistance. Each heat generating part 11 is set in dimensions and shape such that thermal resistance in a lateral direction has a specified value. Thus, the heat generating parts 11 generate specified calorific power by the application of specified voltage to the heat generating parts 11. When generating the specified calorific power, the heat generating parts 11 heat-up to a specified temperature. The heat generating parts 11 that have reached the specified temperature, heat the front surface layer 101 to a specified radiation temperature. The heater device 1 can thus radiate the radiant heat R that makes the occupant 21, that is, the occupant feels warm.

The output, temperature, and calorific power of each of the heat generating parts 11 are controlled by a heater ECU. The heater ECU can control the output, temperature, and calorific power of the heat generating parts 11, by controlling the values of voltage and current applied to the heat generating parts 11. The heater ECU can supply power, obtained from, for example, a battery, to the heater device 1, and can control the supplied power. The heater ECU can control output of the heat generating parts 11 by the power control.

Therefore, the heater ECU is able to vary the amount of radiant heat to be transmitted to the occupant 21. Upon start of electric conduction to the heater device 1 by the heater ECU, the surface temperature of the heater device 1 rapidly rises to the controlled specified radiation temperature. Accordingly, the heater device 1 is able to quickly warm the occupant 21 even in winter, for example.

A heat transferring from the heat generating parts 11 to the front surface layer 101 of the heater device 1 is transferred rapidly to an object being in contact with the front surface layer 101 when the object touches the front surface layer 101. Consequently, the temperature of the portion of the front surface layer 101 touched by the object falls quickly. Therefore, the surface temperature of the heater device 1 falls quickly at the portion touched by the object. The heat of the portion touched by the object is transmitted to the object, and diffuses to the object. Accordingly, excessive rise in the surface temperature of the touching object is restricted.

In a conventional heater device, air in the interior heated by heat generated by the heat generating element can not only flow toward an occupant, but can also produce natural convection and rise along the surfaces of interior members, as indicated by broken-line arrows in FIG. 1. By this phenomenon, the temperature of air in the vicinity of the surfaces of the interior members around the heater device may become higher than the actual air temperature of the interior.

A heat radiation path from the heater device that convects along interior members as described above may thermally affect peripheral devices arranged around the heater device. For example, as a peripheral device, there may be an interior-temperature sensor 250 for measuring temperature of a vehicle interior, as shown in FIG. 1. The interior-temperature sensor 250 acquires air temperature as an electric signal, by contact with air in the interior, the air being sucked by an aspirator hose 25.

The aspirator hose 25 forms a passage through which the vehicle interior communicates with an air mix passage in an air conditioning case for a vehicle air conditioner. The aspirator hose 25 connects an interior-side opening, which is open to the vehicle interior, and a case-side opening, which is open to the air mix passage. Furthermore, the aspirator hose 25 has an exhaust opening, which is open between the interior-side opening and the case-side opening. The exhaust opening is open, for example, in a space behind an instrument panel, and functions as an exhaust port, through which air taken into the aspirator hose 25 from the interior-side opening or the case-side opening is expelled.

When an air-blowing part of the vehicle air-conditioner blows air, part of the air in the air conditioning case flows into the aspirator hose 25 from the interior-side opening, and is expelled from the exhaust opening. As air is expelled from the exhaust opening, air in the vehicle interior is drawn into the aspirator hose 25 from the interior-side opening. Although air in the vehicle interior, drawn in the aspirator hose 25, is emitted from the exhaust opening, the air comes into contact with the interior-temperature sensor 250 disposed between the openings. At this time, the interior-temperature sensor 250 measures air temperature in the vehicle interior.

When the air-blowing part of the vehicle air-conditioner blows air, some of the air in the air conditioning case flows into the aspirator hose 25 from the interior-side opening and is expelled from the exhaust opening located between these openings. As air is expelled from the exhaust opening, air in the vehicle interior is drawn into the aspirator hose 25 from the interior-side opening. Although air in the vehicle interior drawn in the aspirator hose 25 is expelled from the exhaust opening, the air comes into contact with the interior-temperature sensor 250 disposed between the openings. At this time, the interior-temperature sensor 250 measures air temperature in the vehicle interior (i.e., internal air temperature).

However, since the interior-temperature sensor 250, which is an example of a peripheral device of the heater device, measures the temperature of air near the surface of the interior member warmed by the heater device, the interior-temperature sensor 250 may not be able to accurately measure temperature in the vehicle interior and may fail to perform a specified function as a temperature sensor. For example, the inventors of the present disclosure have ascertained that, when surface temperature of the heater body is 100° C., temperature detected by the interior-temperature sensor 250 is about 3° C. higher than actual air temperature in the interior.

In order to solve this problem, the heating device according to the present disclosure has the characteristics described below. This problem occurs not only in the radiation heater device 1, but may also occur in another heating device such as the warm-water type heater device 1A.

Figure 3:
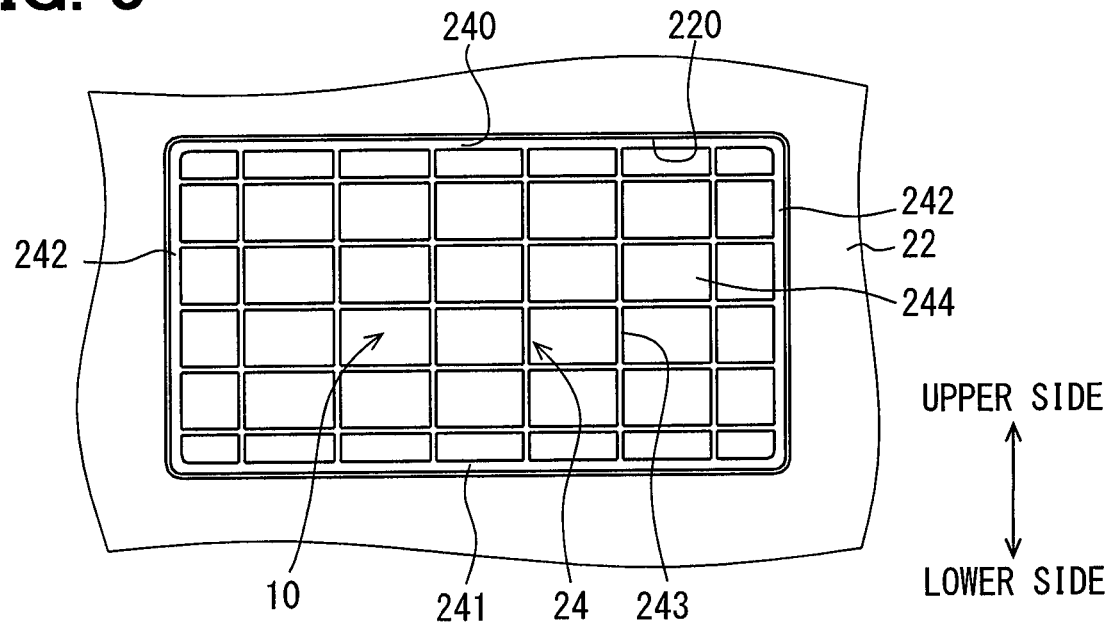
FIG. 3 is a diagram illustrating a radiation heater device in a first embodiment, as seen from the interior side.
Figure 4:
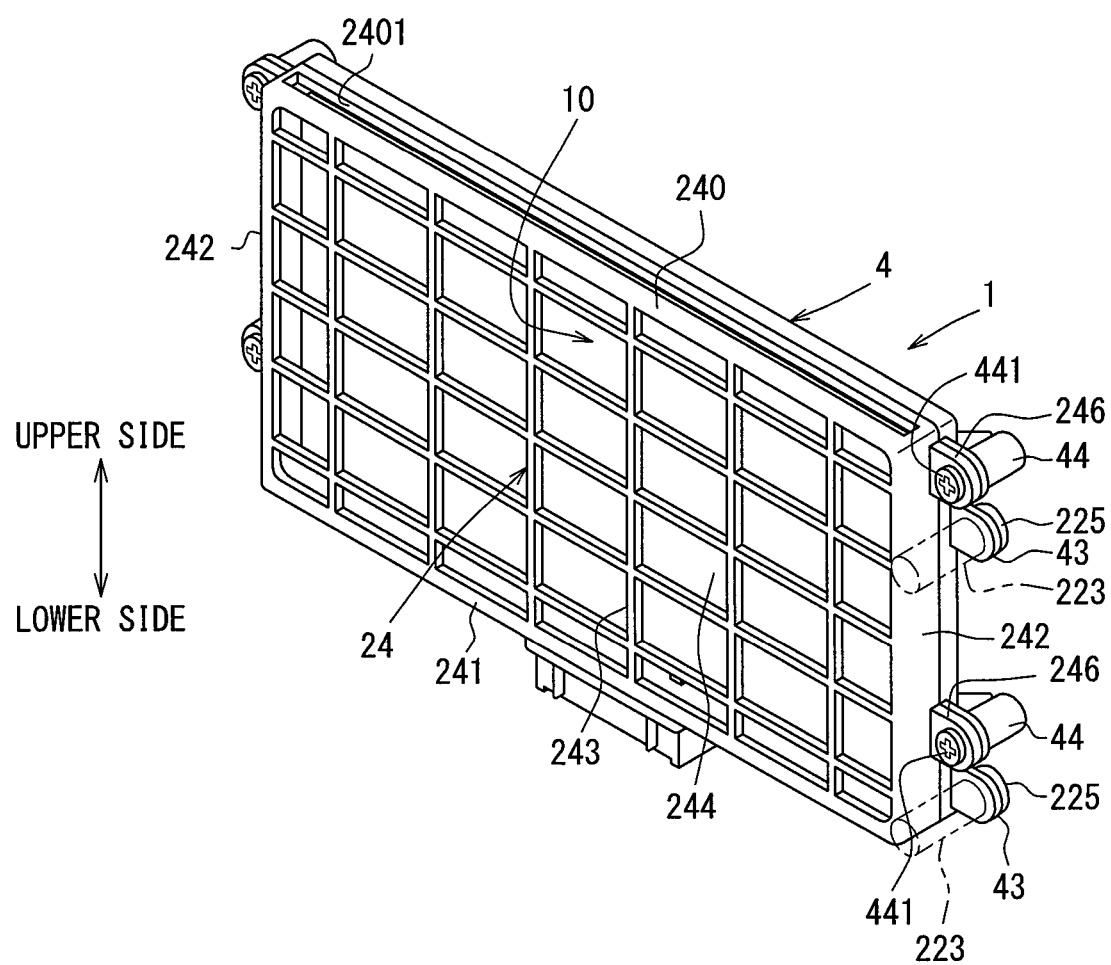
FIG. 4 is a perspective view illustrating the appearance of the radiation heater device in the first embodiment.
Figure 5:
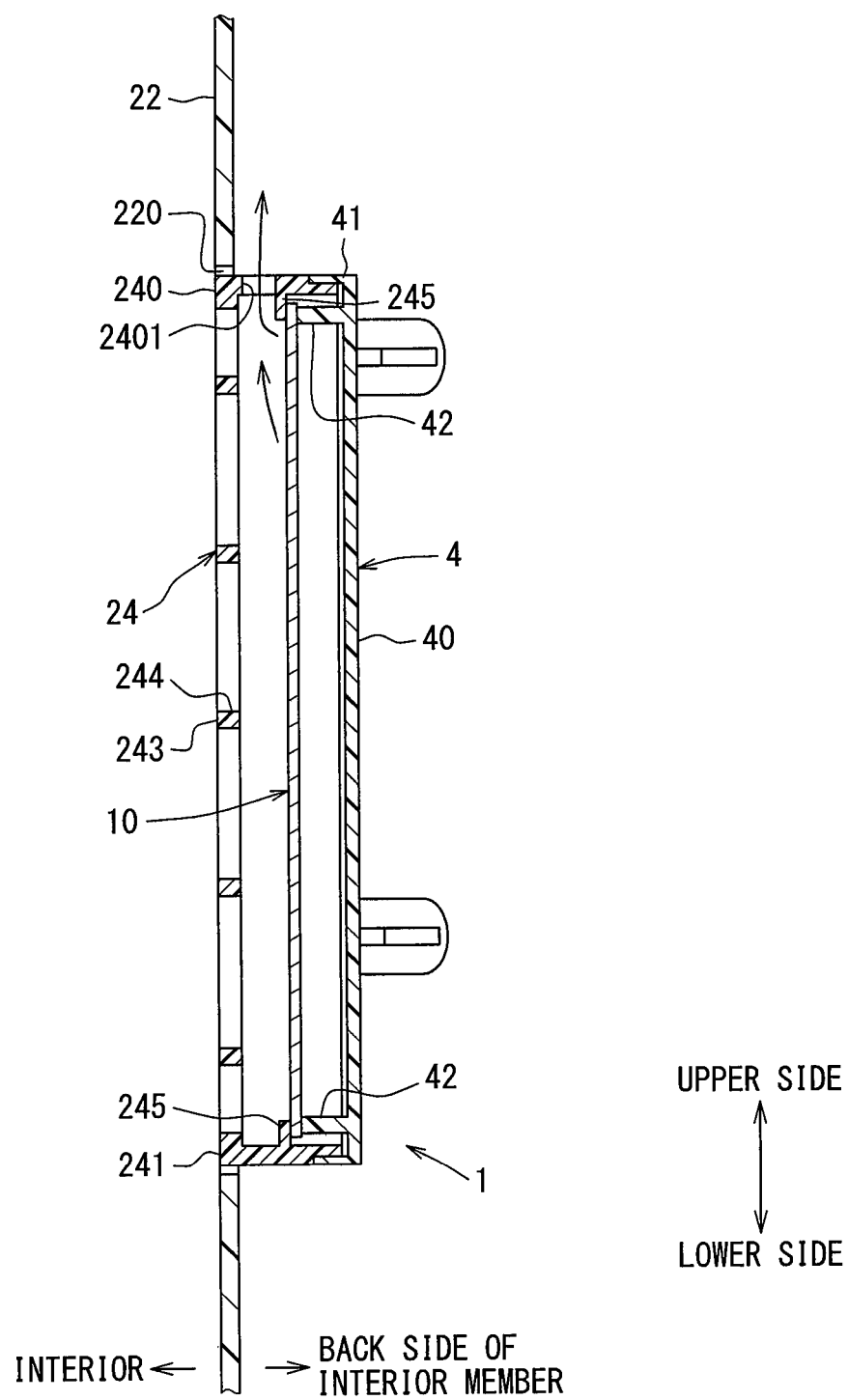
FIG. 5 is a sectional view illustrating the configuration of the radiation heater device according to the first embodiment, and the relation between the radiation heater device and an interior member.

Next, a detailed configuration of the radiation heater device 1 will be described with reference to FIGS. 3 to 5 in addition the configuration of each part. The steering column 22 is provided with an opening 220 that has an opening area where the heater device 1 can be mounted. The heater device 1 is located on a back side of the opening 220, that is, on a back side of the steering column 22. In other words, the heater device is located in a space opposite the vehicle interior with respect to an interior member. The base plate 10 forms a heater body.

The radiation heater device 1 has a guard member 24 located on the vehicle interior side, and a base member 4 located on the back side of the interior member and combined with the guard member 24. In the base plate 10, part of a front surface, which is an interior-side end face, is supported by the guard member 24, and part of a rear surface is supported by the base member 4. Thus, the base plate 10 is supported by the guard member 24 and the base member 4 from both the surface sides thereof. That is, the guard member 24 and the base member 4 form a heater case to house a heater body. The heater body is provided in the heater case such that its interior-side surface is located on a back side of the interior-side surface of the interior member (i.e., on the side opposite the interior side).

The guard member 24 is a frame-shaped member including a grid 243 and a frame part extending upward from the periphery of the grid 243. The frame part forms a quadrangular shape having four sides. The grid 243 has a large number of holes 244. On the vehicle interior side, the guard member 24 has an opening equal to or greater than the front surface layer 101 in size, the opening including the holes 244. It is preferable that the grid 243 be provided almost in the same plane as the surface of the steering column 22. In this configuration, the grid 243 does not protrude from the interior member, thus ensuring a pleasing appearance and preventing any collision between the grid 243 and an occupant.

The frame part of the guard member 24 protrudes from the vehicle interior side where the grid 243 is formed, toward the back side of the interior member. That is, the frame part protrudes so as to form the four sides of a quadrangle toward the opposite side of the vehicle interior. The frame part is formed of four sidewalls, that is, an upper sidewall 240, a lower sidewall 241, and two lateral sidewalls 242. The upper sidewall 240 is located in a relatively upper position. The lower sidewall 241 is located in a relatively lower position and is opposite the upper sidewall 240. The two lateral sidewalls 242 are sides adjacent to the upper sidewall 240 and the lower sidewall 241 respectively and are sides opposite each other.

A through-hole 2401 through which the inside and outside of the guard member 24 communicate with each other is provided in a specified location in the frame part of the guard member 24. As shown in FIGS. 4 and 5, the through-hole 2401 is located between the heater body and the interior and on the back side of the interior member. Between the heater body and the interior refers to a location closer to the interior than the heater body. The through-hole 2401 is a passage passing through the frame part, and is provided at a location in the frame part. The through-hole 2401 in the first embodiment passes through the upper sidewall 240. The through-hole 2401 is provided over the entire length of the upper sidewall 240 in the longitudinal direction of the upper sidewall 240 so as to correspond to the width of the heater body.

Air around the front surface of the heater body, which is warmed by heat generated by the front surface of the heater body, easily flows upward by natural convection. Consequently, the air passes through the through-hole 2401 located on the upper side, and flows onto the back side of the steering column 22. Accordingly, less current of air heated by heat generated by the heater body and flowing in the interior along the steering column 22 after passing through the holes 244 of the guard member 24 is formed. Thus, the through-hole 2401 functions as a ventilation passage, in which air warmed by heat radiated from the front surface layer 101 of the heater body flows, and contributes to restricting an air current flowing in the interior along the interior member. Thus, the guard member 24 configuring a part of the heater case has the through-hole 2401 serving as a ventilation passage through which the space outside of the heater case located on the back side of the interior member communicates with the interior-side surface of the heater body. The function of this ventilation passage is able to reduce uneven upward heat radiation during heating by the heater device, and restrict temperature rise in the interior-side surface of the interior member.

Figure 6:
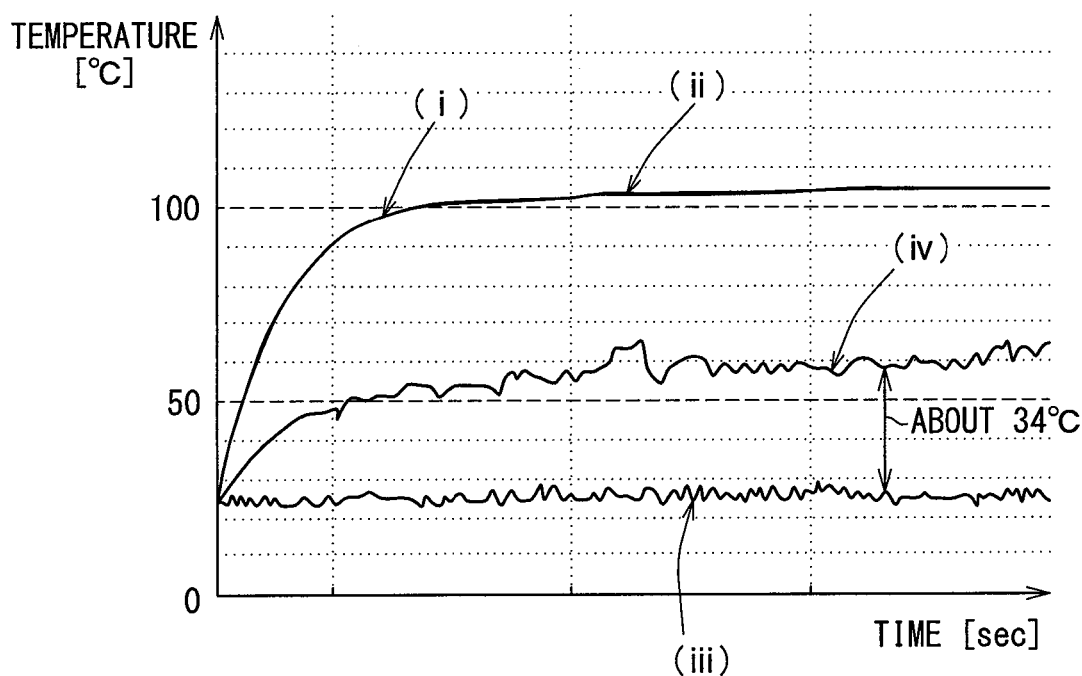
FIG. 6 is a graph showing experimental results from measuring the surface temperature of a guard member in the radiation heater device according to the present disclosure.

FIG. 6 shows a graph of experimental results from measuring the surface temperature of the upper sidewall of the guard member in the radiation heater device 1. The horizontal axis indicates elapsed time (sec) after electric conduction in the heat generating part 11, and the vertical axis indicates the temperature (° C.) of a measured object. In this experiment, test patterns (i) to (iv) are verified using the heater device arranged as to be inclined 60 degrees to a horizontal position. In the graph in FIG. 6, both the patterns (i) and (ii) indicate temperature measurements of the heater surface. A heater device without the above-described ventilation passage is used in the test pattern (i) whereas a heater device with the above-described ventilation passage is used in the test pattern (ii). In both the test patterns (i) and (ii), the measured objects are heater surfaces. Therefore, regardless of presence or absence of a ventilation passage, temperature changes are similar, and constant temperatures over 100° C. are found.

Both the test patterns (iii) and (iv) indicate temperature measurements of the upper sidewall of the guard member. A heater device with the above-described ventilation passage is used in the test pattern (iii) whereas a heater device without the above-described ventilation passage is used in the test pattern (iv). The result shows that the test pattern (iii) is about 34° C. lower in measured temperature than the test pattern (iv). This is because a ventilation passage enables restriction of an air current flowing in the interior along the interior member, as described above. Therefore, this experimental result confirms that the test pattern (iii) with a ventilation passage has less thermal effect on the interior-side surface of the interior member. The foregoing confirms the advantageous effect that air liable to convect toward a higher place than the surface of the heater body is caused to flow to the back side of the interior member via the through-hole 2401, and excessive temperature rise in the front side of the interior member can thereby be prevented.

Attachment pieces 246 protruding outward are provided in the frame part of the guard member 24. A through-hole is formed in each attachment piece 246. When the guard member 24 and the base member 4 are integrally fitted together, a screw 441 for fixing is inserted into the through-hole. Boss parts 44 provided with screw holes are provided in the outer peripheral edge parts 41 of the base member 4. Each boss part 44 is provided such that, when the guard member 24 is set and fixed in a specified position with respect to the base member 4, the screw hole of the boss part 44 and the through-hole of the corresponding attachment piece 246 coincide. By inserting and tightening the screw 441 into the screw hole of the boss part 44 and the through-hole of the attachment piece 246, which have coincided, the attachment piece 246 is pressed against the end face of the boss part 44 by the head of the screw 441, and the guard member 24 is consequently fixed to the base member 4.

The base member 4 and the guard member 24 are provided with respective portions fitted to each other, so that the heater device may be formed such that the heater body is integrated between the members 4, 24.

The base member 4 is a frame-shaped member that has a ceiling portion 40 and an outer peripheral edge part 41 forming a frame part extending upward from the periphery of the ceiling portion 40. The outer peripheral edge part 41 forms a quadrangle having four sides and is similar in shape to the frame part of the guard member 24. When the outer peripheral edge part 41 fits in the frame part of the guard member 24, the guard member 24 and the base member 4 are integrally fitted together. Therefore, the ceiling portion 40 is arranged so as to face the rear surface layer 102 of the heater body.

Support pieces 245 that support a part of the front surface layer 101, which is the interior-side end face of the base plate 10, are provided in the frame part of the guard member 24. The support pieces 245 respectively protrude inward from specified sites of the frame part along the base plate 10. Support pieces 42 for supporting a part of the rear surface layer 102 of the base plate 10 are provided in the ceiling portion 40 of the guard member 24. The support pieces 42 protrude from specified sites of the ceiling portion 40 in a direction intersecting the base plate 10. Thus, the base plate 10 is retained by being interposed between the support pieces 245 of the guard member 24 and the support pieces 42 of the base member 4 and being supported from both of the surface sides.

Attachment pieces 43 protruding outward are provided in the outer peripheral edge parts 41 of the base member 4. A through-hole is formed in each attachment piece 43. When the heater device is fixed to the interior member, a fixing screw 225 is inserted into the through-hole. Boss parts 223 provided with screw holes are provided in the steering column 22 on the rear surface side (see FIG. 4). Each boss part 223 is provided such that, when the heater device is set and fixed in a specified position with respect to the interior member, the screw hole of the boss part 223 and the through-hole of the corresponding attachment piece 43 coincide. By inserting and tightening the screw 225 into the screw hole of the boss part 223 and the through-hole of the attachment piece 43, which have coincided, the attachment piece 43 is pressed against the end face of the boss part 223 by the head of the screw 225, and the heater device is consequently fixed to the interior member.

The base member 4 is located on a back side of the heater body, and functions also as a heat insulation part that restricts heat from the heater body from being radiated to the back side. The base member 4 is made of a material with heat insulation properties, such as a foamable or rubber material, or urethane resin. The base member 4 is formed from a material higher in heat insulation properties than the heat generating parts 11 and the front surface layer 101.

A space is defined between the base plate 10 and the base member 4. The space forms an air chamber in which air is present. The air chamber is defined as a space surrounded by the respective frame parts of the base member 4 and guard member 24 and the heater body. The air chamber is a space sectioned and defined on the back side of the heater body, and forms a heat insulation part that prevents heat from the heater body from being radiated to the back side.

A hole is formed in the ceiling portion 40 of the base member 4, and, for example, a harness lead wire is disposed in the hole to pass through the hole. A harness has a lead wire in which an electric current wire for supply of electric current to the heat generating part 11 and a signal wire for temperatures and so on are bundled, and a connector terminal for the lead wire.

Next, the procedure for attaching the radiation heater device 1 to the interior member will be described. First, the guard member 24 and the base member 4 are fixed by the above-described screws 441, on a condition that the heater body is interposed between the guard member 24 and the base member 4 and retained at a specified position. To attach the guard member 24 to the steering column 22, the attachment pieces 43 and the corresponding boss parts 223 are aligned and fixed by the screws 225 described above. Consequently, the radiation heater device 1 is fixed to the interior member. Alternatively, the case where the base member 4 and the guard member 24 are integrated may be fixed to the interior member by having a portion that is fitted in the interior member.

Next, functional effects of the heating device in the first embodiment will be described. The heating device has: the heater body (i.e., the base plate 10) which externally radiates heat generated by the heat generating parts 11; and the heater case (i.e., the guard member 24 and the base member 4) for storing the heater body. The heater body is attached to the interior member provided in the interior, and is arranged such that the interior-side surface of the heater body is located on the back side of the interior member. The ventilation passage (i.e., the through-hole 2401), through which the space outside the heater case located on the back side of the interior member communicates with the interior-side surface of the heater body, is provided in the heater case.

According to this configuration, the heater body is arranged such that the front surface layer 101 is located on the back side of the interior member. Furthermore, the through-hole 2401, through which the space outside the heater case and the interior-side surface of the heater body communicate with each other, is provided in the heater case. Thus, part of heat radiated from the interior-side surface of the heater body toward the interior can be expelled, through the through-hole 2401, to the back side of the interior member which is the space outside the heater case. Accordingly, air heated by heat radiated by the heater body can be prevented from flowing out upward along the surface of the interior member due to natural convection. Also, it is possible to prevent partial temperature rise in the periphery of the heating device due to warm-air currents flowing in a higher place than the heating device. As a result, for example, adverse effects on temperature measurement by the interior-temperature sensor can be avoided. Accordingly, an incorrect measurement detecting a temperature higher about 3° C. can be improved as described above, and thereby a comfortable air conditioner as required etc. can be provided by accurate temperature detection. Therefore, it is possible to provide a heating device that reduces the thermal effect on peripheral devices and securely makes a user feel warm. Thus, the first embodiment is able to provide a heating device that reduces the thermal effect on the peripheral devices and securely makes a user feel warm.

In addition, a ventilation passage (i.e., the through-hole 2401) is located between the heater body and the interior and on the back side of the interior member, thereby forming a passage passing through the heater case. Accordingly, before heat radiated from the surface of the heater body is let into the interior through an opening in the interior member, air currents generated by natural convection can be caused to quickly flow to the back side of the interior member through the ventilation passage.

In addition, the heater body is housed in the heater case such that one end is located above the other end. The ventilation passage (i.e., the through-hole 2401) is provided in the heater case at the one end. Accordingly, since the ventilation passage is located at a higher place, ascending air currents due to natural convection can be caused to quickly flow to the back side of the interior member. Accordingly, it is possible to securely prevent superfluous convection flowing upward along the interior-side surface of the interior member, which does not contribute to making a user feel warm.

In addition, the heater device 1 is mounted such that the heater body does not protrude toward the vehicle interior from the interior member such as the steering column 22. Therefore, accidental contact of an occupant with the heater body can be prevented. Furthermore, since the heater body is disposed not to protrude from a surface of the interior member, an appearance of the heater device 1 when viewed from the vehicle inside is excellent, and a passenger can be prevented from being in contact with the heater body in an unexpected situation.

The heater device 1 has the base member 4 provided on the back side of the heater body and configured to prevent heat from the heater body from being radiated to the back side. The base member 4 is a member with heat insulation properties. According to this configuration, radiation from the heater body to the back side can be restricted by the base member 4. Therefore, the radiation heater device 1, excellent in heating efficiency, can be realized.

Furthermore, the heater device 1 has the air chamber that is a space partitioned and defined on the back side of the heater body and in which air is present. The air chamber is formed of the space defined between the rear surface of the heater body and the base member 4. According to the configuration, heat radiation from the heater body to the back side can be restricted by the air chamber. In this case also, the radiation heater device 1, excellent in heating efficiency, can be provided.

Second Embodiment

Figure 7:
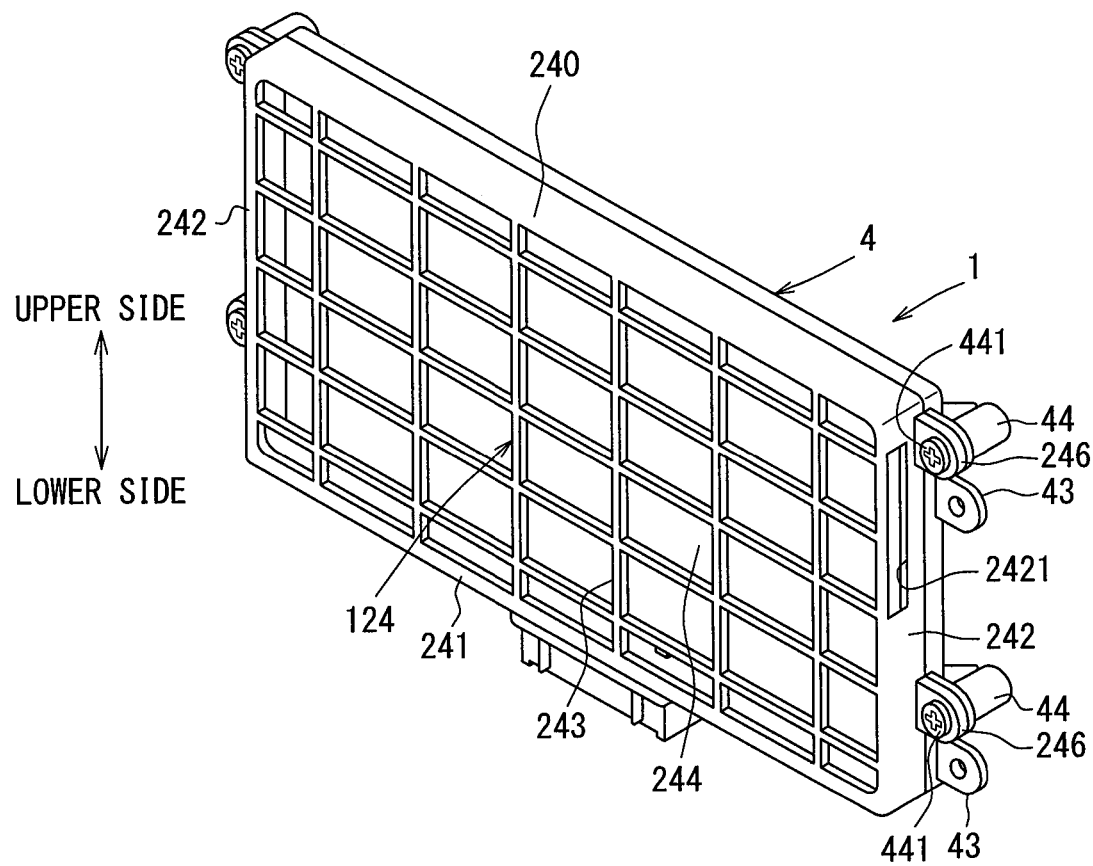
FIG. 7 is a perspective view illustrating the appearance of a radiation heater device in a second embodiment.

A second embodiment will be described with reference to FIG. 7. In the second embodiment, components denoted with reference signs identical to those in the drawings relating to the first embodiment, and configurations that are not described, are similar to those in the first embodiment and produce similar functional effects. In the second embodiment, only portions different from the first embodiment will be described. In FIG. 7, the screwed fixing structure relating to the attachment pieces 43 and the boss parts 223, illustrated in FIG. 4, is omitted.

The heater device 1 in the second embodiment differs from that in the first embodiment in that an upper sidewall 240 has no through-hole 2401 and that a through-hole 2421 having a function as a ventilation passage is formed in a lateral sidewall 242. The through-hole 2421, through which the inside and outside of a guard member 124 communicate with each other, is provided at a specified location in a frame part of the guard member 124. The through-hole 2421 is located between a heater body and an interior and on the back side of an interior member. The through-hole 2421 is a passage passing through a frame part and passes through the lateral sidewall 242. Therefore, the guard member 124 configuring a part of a heater case has the through-hole 2421 serving as a ventilation passage through which the space outside the heater case located on the back side of the interior member and the interior-side surface of the heater body communicate with each other. Thus, even in a case that the through-hole 2421 is provided in the lateral sidewall 242 instead of an upper sidewall 240, the through-hole 2421 functions as a ventilation passage that causes air heated by the surface of the heater body to flow upward on the back side of the interior member.

It is preferable for the through-hole 2421 to be provided in the upper part of the lateral sidewall 242. This is because heated air liable to flow upward by natural convection can be guided to the back side of the interior member more smoothly. It is preferable that the through-hole 2421 be located above the middle part of the lateral sidewall 242. For example, it is preferable for the through-hole 2421 to be provided within the range of the upper half of the lateral sidewall 242.

The heater device 1 in the second embodiment reduces formation of air current flowing in the interior along a steering column 22 after air heated by generation of heat by the heater body passes through the holes 244 of the guard member 124. As described above, the through-hole 2421 functions as a ventilation passage through which air warmed by heat radiating from the front surface layer 101 of the heater body passes. Thus, the through-hole 2421 contributes to restriction of air current flowing in the interior along the interior member. Since the through-hole 2421 functions as a ventilation passage, uneven upward heat radiation during heating by the heater device is reduced, making it possible to prevent temperature rise in the interior-side surface of the interior member.

Third Embodiment

Figure 8:
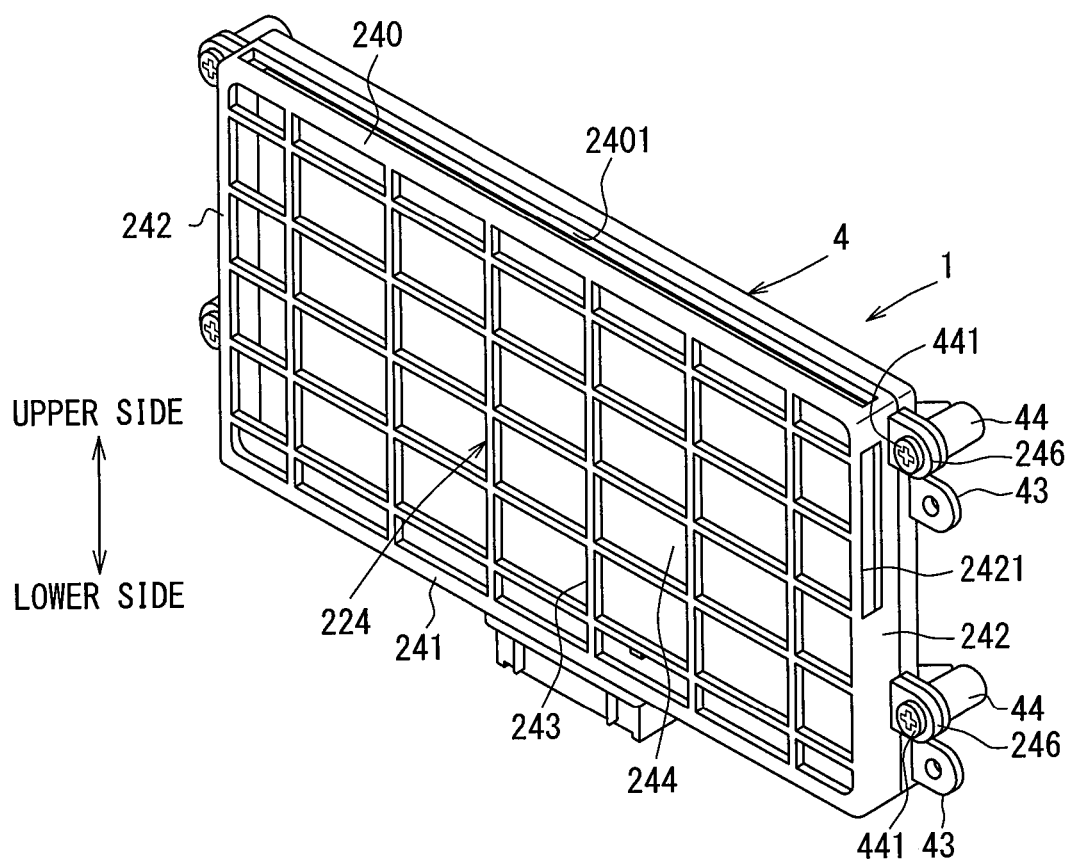
FIG. 8 is a perspective view illustrating the appearance of a radiation heater device in a third embodiment.

A third embodiment will be described with reference to FIG. 8. In the third embodiment, component parts denoted with reference signs identical to those in the drawings relating to the first embodiment, and configurations that are not described, are similar to those in the first embodiment and produce similar functional effects. In the third embodiment, only portions different from those in the first embodiment will be described. In FIG. 8, the screwed fixing structure relating to the attachment pieces 43 and the boss parts 223, illustrated in FIG. 4, is omitted.

The heater device 1 in the third embodiment differs from the heater device 1 in the first embodiment in that, in addition to a through-hole 2401 in an upper sidewall 240, a through-hole 2421 identical to the through-hole 2421 in the second embodiment is provided in a lateral sidewall 242. Therefore, a guard member 224 has the through-hole 2401 in the upper sidewall 240 and the through-hole 2421 in the lateral sidewall 242, which function as ventilation passages.

The heater device 1 in the third embodiment reduces formation of air current flowing in an interior along a steering column 22 after air heated by generation of heat by a heater body passes through holes 244 of the guard member 224. As described above, the through-hole 2401 and the through-hole 2421 function as ventilation passages through which air warmed by heat radiating from a front surface layer 101 of the heater body passes. Thus, the through-hole 2401 and the through-hole 2421 contribute to restriction of air current flowing in the interior along an interior member. Therefore, the guard member 224 configuring a part of a heater case has the through-hole 2401 and through-hole 2421 as ventilation passages through which a space outside the heater case located on a back side of the interior member communicates with an interior-side surface of the heater body. According to the functions of the through-hole 2401 and through-hole 2421 as ventilation passages, uneven upward heat radiation during heating by the heater device is promptly eliminated, making it possible to prevent temperature rise in the interior-side surface of the interior member.

Fourth Embodiment

Figure 9:
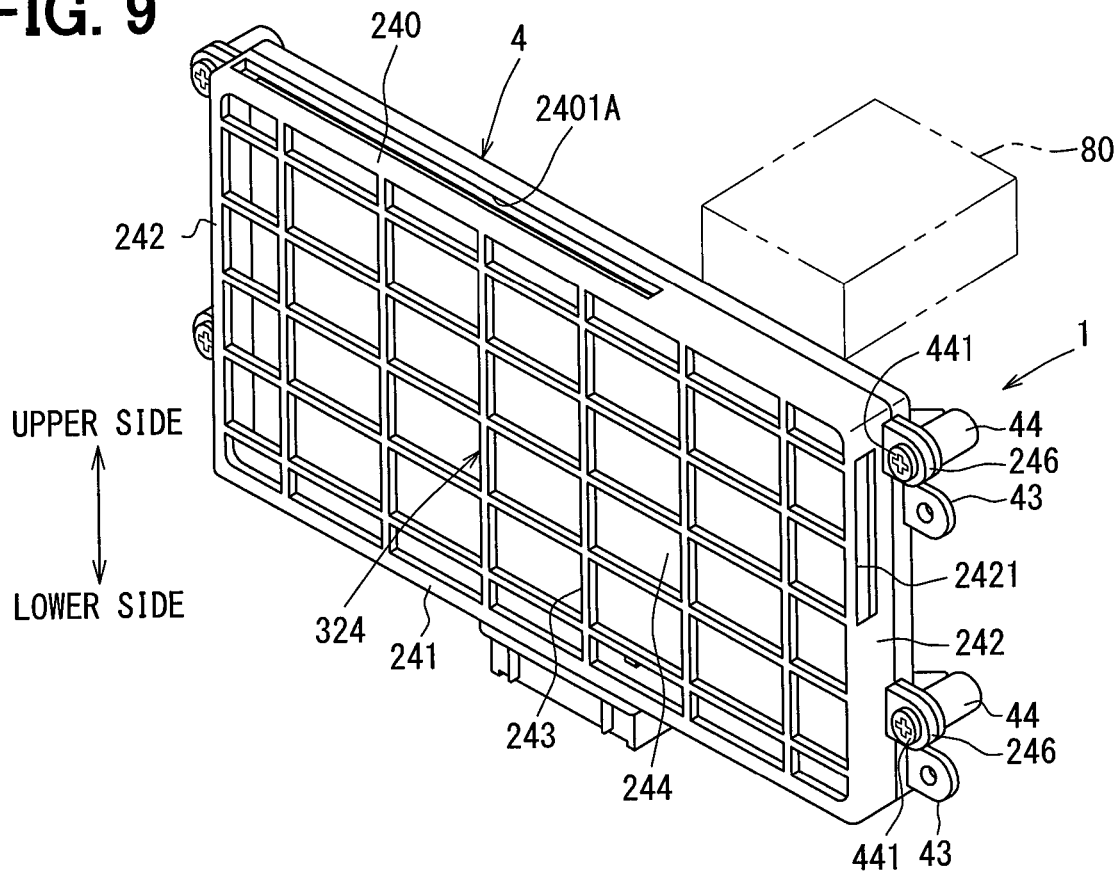
FIG. 9 is a perspective view illustrating the appearance of a radiation heater device in a fourth embodiment.

A fourth embodiment will be described with reference to FIG. 9. In the fourth embodiment, component parts denoted with reference signs identical to those in the drawings relating to the third embodiment, and configurations that are not described, are similar to those in the third embodiment and produce similar functional effects. In the fourth embodiment, only portions different from those in the third embodiment will be described. In FIG. 9, the screwed fixing structure relating to the attachment pieces 43 and the boss parts 223, illustrated in FIG. 4, is omitted.

The heater device 1 in the fourth embodiment differs from the heater device 1 in the third embodiment in terms of location of a through-hole 2401A that functions as a ventilation passage. The through-hole 2401A forms a ventilation passage that is located between a heater body and an interior and on a back side of an interior member and that passes through an upper sidewall 240.

Peripheral devices 80 with electronic components are provided on the back side of the interior member and around the heater device 1. The peripheral devices 80 are various kinds of devices to be mounted in the vehicle, such as an electronic control device and an ETC device (ETC is a registered trademark), and have electronic components liable to thermal effect. The through-hole 2401A is provided not to be located in a projection range that is defined when projecting the peripheral devices 80 on the upper sidewall 240. The through-hole 2401A is located in the upper sidewall 240 and on the side opposite the side adjacent to the peripheral devices 80. According to the above-described configuration, air, heated by generation of heat by the heater device 1 and caused to flow out on the back side of the interior member via the through-hole 2401A, flows so as not to come into direct contact with the peripheral devices 80.

The heater device 1 in the fourth embodiment reduces formation of air current flowing in the interior along a steering column 22 after air heated by generation of heat by a heater body passes through the holes 244 of a guard member 324. At this time, heated air flowing on the back side of the steering column 22 via the through-hole 2401A does not flow toward the peripheral devices 80. Accordingly, it is possible to form a heat radiation path that avoids warming and thermally affecting the peripheral devices 80.

Fifth Embodiment

Figure 10:
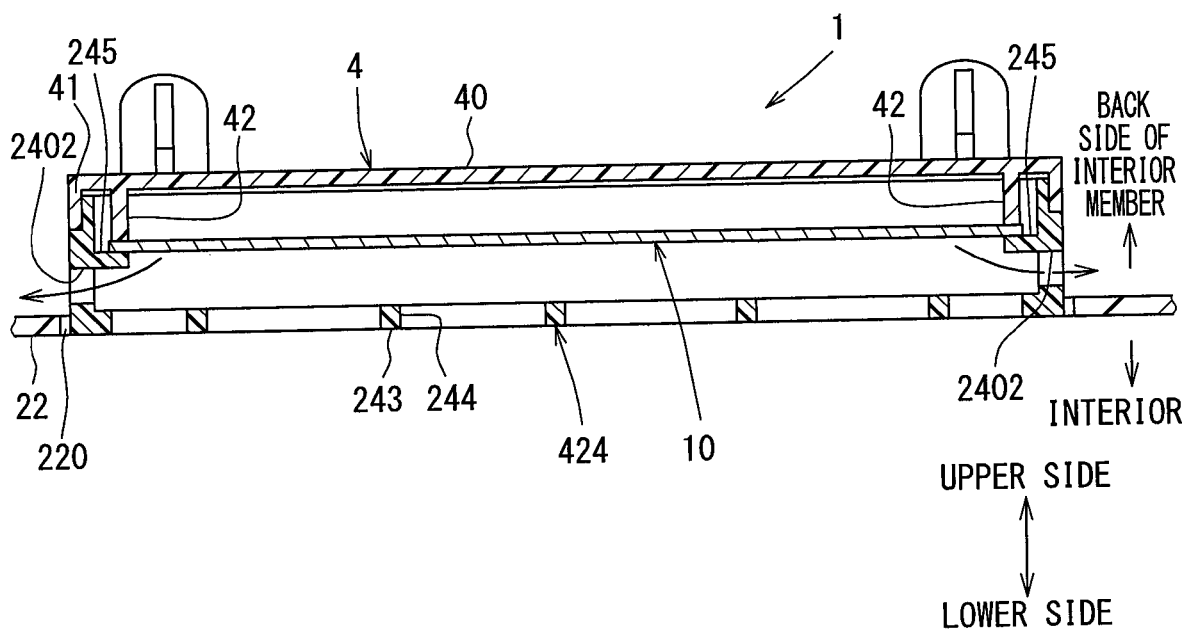
FIG. 10 is a sectional view illustrating the configuration of a radiation heater device in a fifth embodiment, and the relation between the radiation heater device and an interior member.

A fifth embodiment will be described with reference to FIG. 10. In the fifth embodiment, component parts denoted with reference signs identical to those in the drawings relating to the first embodiment, and configurations that are not described, are similar to those in the first embodiment and produce similar functional effects. In the fifth embodiment, only portions different from those in the first embodiment will be described. In FIG. 10, the screwed fixing structure relating to the attachment pieces 43 and the boss parts 223, illustrated in FIG. 4, is omitted.

The heater device 1 in the fifth embodiment differs from the heater device 1 in the first embodiment in that the heater device 1 in the fifth embodiment is attached to an interior member such that a heater body is horizontal, as shown in FIG. 10. A through-hole 2402 in the fifth embodiment is provided in an arbitrary sidewall of a frame part of a guard member 424. That is, the through-hole 2402 may be provided in any of four sidewalls forming four sides as long as the through-hole 2402 is located so as to pass through the frame part between a heater body and an interior and on the back side of the interior member.

According to the heater device 1 in the fifth embodiment, air heated by generation of heat by the heater body flows out to a back side of a steering column 22 from the through-hole 2402, and then rises away from the rear surface of the steering column 22 by natural convection. Formation of such a flow reduces formation of air current flowing in the interior along the steering column 22 after air heated by generation of heat by the heater body passes through holes 244 of the guard member 424. The through-hole 2402 functions as a ventilation passage through which air warmed by heat radiating from a front surface layer 101 of the heater body passes. Thus, the through-hole 2402 contributes to restriction of air current flowing in the interior along the interior member. The function of the through-hole 2402 as a ventilation passage is able to prevent temperature rise in an interior-side surface of the interior member during heating by the heater device.

Sixth Embodiment

A sixth embodiment will be described with reference to FIG. 11. In the sixth embodiment, component parts denoted with reference signs identical to those in the drawings relating to the first embodiment, and configurations that are not described, are similar to those in the first embodiment and produce similar functional effects. In the sixth embodiment, only portions different from the first embodiment will be described.

Figure 11:
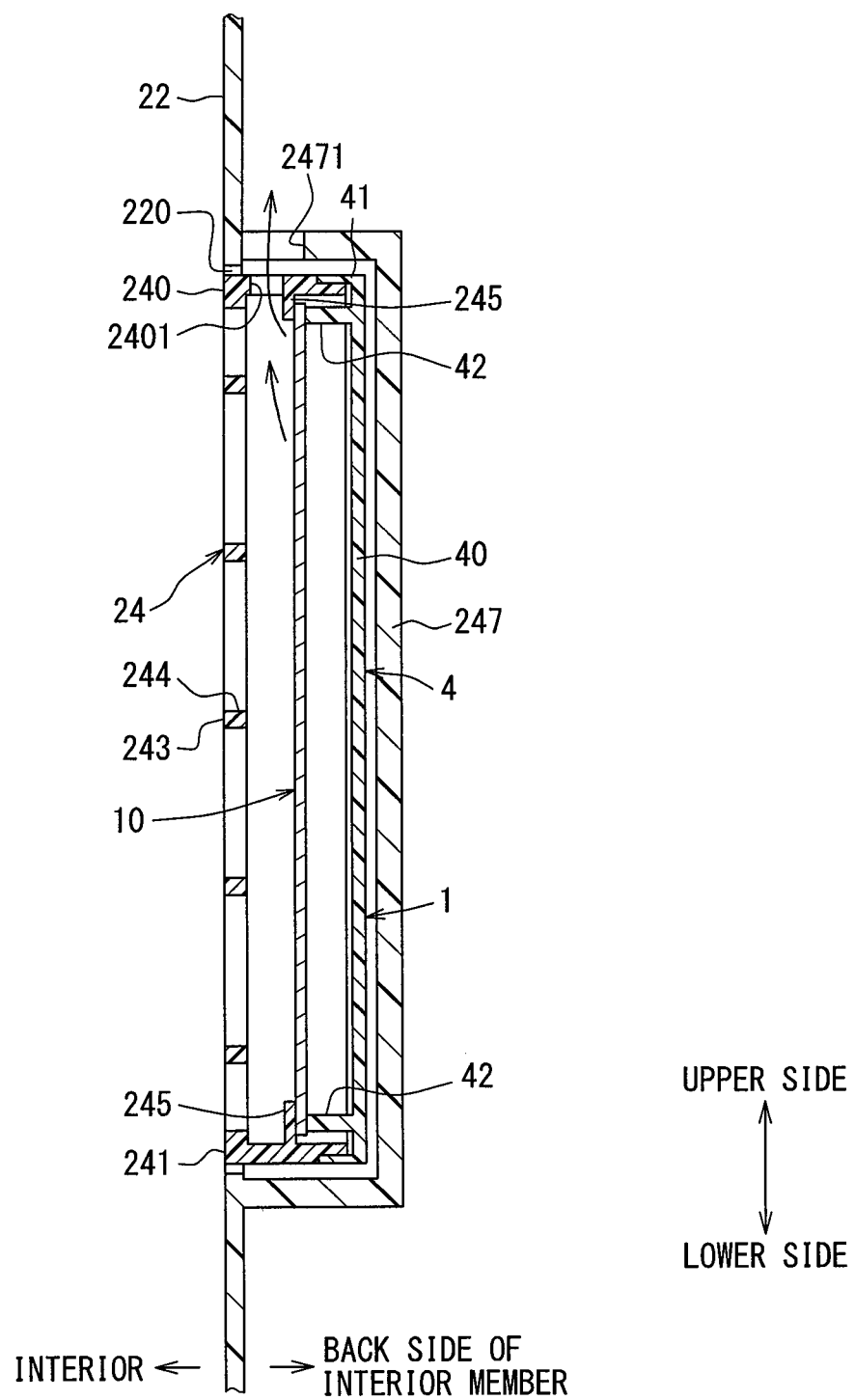
FIG. 11 is a sectional view illustrating the configuration of a radiation heater device in a sixth embodiment, and the relation between the radiation heater device and an interior member.

As shown in FIG. 11, the sixth embodiment discloses a steering column 22 in which a box part 247 defining a pocket-shaped housing part is defined. An assembly, which is configured by the guard member 24 and the base member 4 coupled to be a single body, is disposed in the housing part that is provided in the box part 247. The guard member 24 and the base member 4 therebetween support the heater body together with each other. The box part 247 is provided such that the opening 220 formed in the steering column 22 is covered from the side opposite to the interior. The box part 247 is provided with an insertion opening for inserting the above-mentioned assembly. The assembly including the heater body is slid through the insertion opening and is disposed to the steering column 22.

The insertion opening is an inlet for insertion of the assembly into the pocket-shaped housing part, and the capacity of the housing part is set greater than the dimensions of the assembly. Furthermore, in the box part 247, a through-hole 2471 is provided in a sidewall in a location corresponding to a through-hole 2401 in the guard member 24. The through-hole 2471 is provided between the heater body and the interior and on the back side of the interior member, and forms a passage continuing to the through-hole 2401. Therefore, the through-hole 2471 exhibits the function of a ventilation passage like the through-hole 2401 in the foregoing embodiments. Thus, the box part 247 has the through-hole 2471 serving as a ventilation passage through which the space outside the heater case located on the back side of the interior member communicates with the interior-side surface of the heater body.

Seventh Embodiment

A seventh embodiment will be described with reference to FIG. 12. In the seventh embodiment, component parts denoted with reference signs identical to those in the drawings relating to the first embodiment, and configurations that are not described, are similar to those in the first embodiment and produce similar functional effects. In the seventh embodiment, only portions different from those in the first embodiment will be described.

Figure 12:
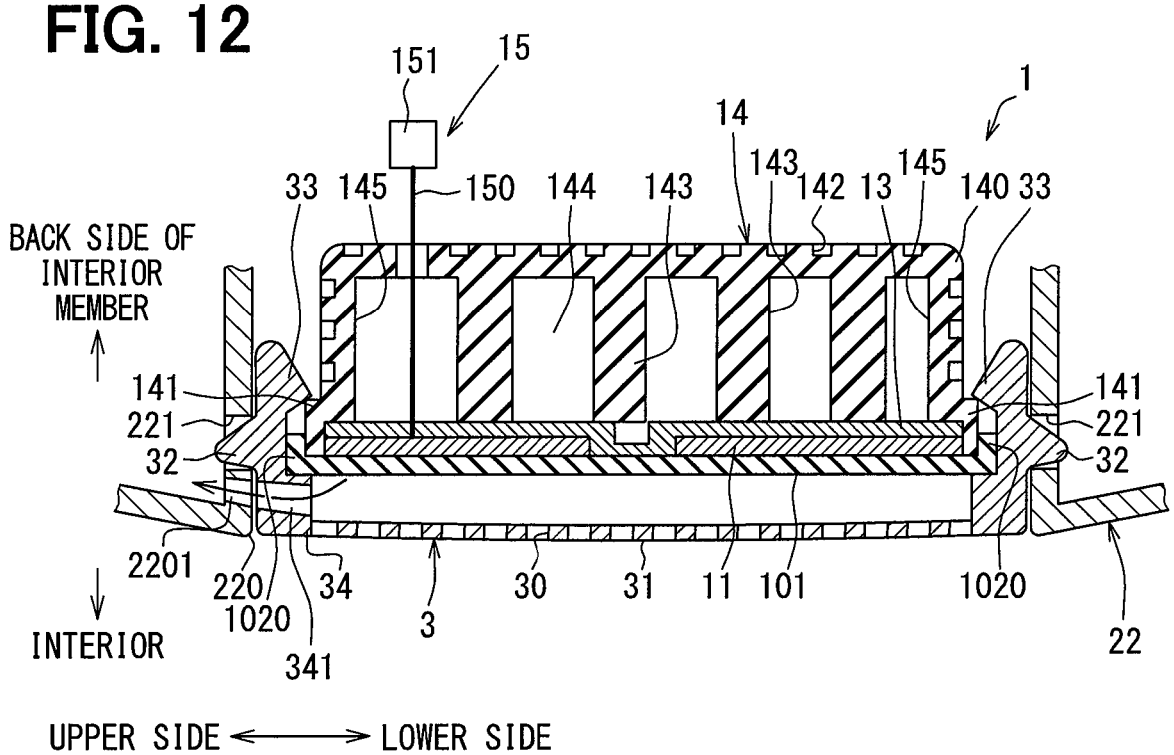
FIG. 12 is a sectional view illustrating the configuration of a radiation heater device in a seventh embodiment, and the relation between the radiation heater device and an interior member.

In FIG. 12, the base plate 10 has: a heat generating part 11, a front surface layer 101, and an aluminum film 13 equivalent to a rear surface layer. The base plate 10 forms a heater body. In the base plate 10, a lower part and side parts are supported by a guard member 3, and an upper part is supported by the heat insulation member 14.

The aluminum film 13 is located on the rear surface of the base plate 10, and forms a first radiation-restricting layer that restricts radiation of radiant heat to a back side of the base plate 10. The aluminum film 13 is set so as to be smaller in radiant heat emissivity than the heat generating part 11 and the front surface layer 101. The aluminum film 13 can be formed, for example, by adhesion of an aluminum deposition film or an aluminum sheet.

The heat insulation member 14 is provided on the back side of the heater body, and forms a heat insulation part that prevents heat from the heater body from being radiated to the back side. The heat insulation member 14 is formed from a material with heat insulation properties, such as a foamable or rubber material, or urethane resin. A heat insulation member 14 is formed from a material higher in heat insulation performance than the heat generating parts 11 and the front surface layer 101.

The heat insulation member 14 has columnar portions 143, 145 and a ceiling portion 140. The columnar portions 143, 145 extend toward the vehicle interior side. The ceiling portion 140 is located on a side of the heat insulation member 14 opposite from the vehicle interior side and coupled with a base portion of the columnar portions 143, 145. That is, the heat insulation member 14 is a member having a comb shape in a longitudinal section. The columnar portions 143 and the outermost columnar portions 145 partially protrude toward the rear surface of the heater body. The columnar portions 143 are arranged to be in contact with the aluminum film 13, and the columnar portions 145 are arranged to be in contact with the aluminum film 13 and the front surface layer 101.

Spaces are defined between adjacent columnar portions 143, between columnar portions 143, 145, and between columnar portions 143. The spaces are air chambers 144, in which air is present. The air chambers 144 are defined as spaces surrounded by the columnar portions 143 and columnar portions 145, the heater body, and the ceiling portion 140. The air chambers 144 are spaces sectioned and defined on the back side of the heater body, and form heat insulation parts that restrict heat from the heater body from being radiated to the back side. Therefore, the air chambers 144, and the columnar portions 143 and columnar portions 145, both of which have heat insulation properties, are provided on the back side of the heater body.

In addition, it is preferable for the heat insulation member 14 to have recessed portions 142 that form irregularities on at least the external surface of the heat insulation member 14. By having the recessed portions 142, the contact area of the heat insulation member 14 with peripheral members can be made small. That is, it is able to contribute to restriction of heat radiation to the peripheral members from the heat insulation member 14.

In addition, in the heat insulation member 14, it is preferable that a second radiation-restricting layer that restricts radiation of radiant heat to the outside be provided in the surface located on the heater body side. The second radiation-restricting layer can be provided in the surface located on the heater body side of the ceiling portion 140, and on the respective surfaces of the columnar portions 143 and columnar portions 145. The second radiation-restricting layer is set so as to be lower in radiant heat emissivity than the heat generating part 11 and the front surface layer 101. The second radiation-restricting layer can be formed, for example, by adhesion of an aluminum deposition film or an aluminum sheet.

A hole is formed in the ceiling portion 140, and a lead wire 150 for a harness 15 is disposed in the hole to pass through the hole. The harness 15 has: the lead wire 150 in which an electric current wire for supply of electric current to the heat generating parts 11 and a signal wire for temperatures and so on are bundled; and a connector terminal 151 for the lead wire 150.

A guard member 3 is a frame-shaped member that has: a grid 31; and a frame part extending upward from the periphery of the grid 31. The frame part is provided with external protruding portions 32, which protrude outward, and internal protruding portions 33, which protrude inward in sites away from the grid 31 with respect to the external protruding portions 32. In the inner edge part of the opening 220, an engaging hole 221 is formed in a wall part extending upward on the back side of the steering column 22.

The grid 31 forms a large number of holes 30. On the vehicle interior side, the guard member 3 has an opening of which size is equal to or greater than the front surface layer 101, and the opening includes the holes 30. It is preferable that the grid 31 is provided almost in the same plane as the surface of the steering column 22. In this configuration, the grid 31 does not protrude from the interior member, thus ensuring a pleasing appearance and preventing collision between the grid 31 and an occupant.

An upper sidewall 34, of the four sides forming the frame part of the guard member 3, is located relatively above has a through-hole 341 communicating with the inside and outside of the guard member 3. As shown in FIG. 12, the through-hole 341 is a passage that is located between the heater body and the interior and on the back side of the interior member and that passes through the upper sidewall 34. For example, the through-hole 341 is provided over the entire upper sidewall 34 in the longitudinal direction of the upper sidewall 34 so as to correspond to the width of the heater body.

In a steering column 22, a through-hole 2201 is provided in a sidewall in a location corresponding to the through-hole 341 of the guard member 3. The through-hole 2201 forms a passage provided between the heater body and the interior and on the back side of the interior member and continuous with the through-hole 341. Thus, as with the through-hole 341, the through-hole 2201 exhibits the function of a ventilation passage. Therefore, the interior member has the through-hole 2201 as a ventilation passage through which the space outside the heater case located on the back side of the interior member communicates with the interior-side surface of the heater body.

Air near the front surface heated by heat generated by the front surface of the heater body is liable to flow upward by natural convection. Consequently, the air passes through the through-holes 341 and 2201 located on the upper side and flows on the back side of the steering column 22. As a result, less current of air that is heated by heat generated by the heater body and flows in the interior along the steering column 22 after passing through the holes 30 of the guard member 3 is caused. As described above, a series of passages formed by the through-holes 341 and 2201 functions as a ventilation passage, through which air warmed by heat radiated from the front surface layer 101 of the heater body passes, and contributes to restriction of an air current flowing in the interior along the interior member. The function of the ventilation passage that is continuous by the through-holes 341 and 2201 is able to reduce uneven upward heat radiation during heating by the heater device, and prevent temperature rise in the interior-side surface of the interior member.

Next, the procedure for attaching the heater device 1 in the seventh embodiment to the interior member is described. First, the heater body is interposed between the guard member 3 and the heat insulation member 14 and supported therebetween on a condition that the heater body has the front surface layer 101, the heat generating parts 11, and the aluminum film 13 integrated with each other. At this time, an outer periphery 1020 of the front surface layer 101 is pressed by an end portion 141 of the columnar portions 145. The outer periphery 1020 is bent to fit an outer periphery of the end portion 141 and supported by an inner periphery of the guard member 3 and the end portion 141 on a condition of being interposed between the inner periphery of the guard member 3 and the end portion 141.

To attach the guard member 3 to the steering column 22, the external protruding portion 32 is inserted in the engaging hole 221. The external protruding portion 32 is supported by the corresponding engaging hole 221, and the guard member 3 is supported so as not to fall on the vehicle interior side. Thus, the guard member 3, in which the heater body and the heat insulation member 14 are integrated, is attached to the interior member.

Eighth Embodiment

An eighth embodiment will be described with reference to FIG. 13. In the eighth embodiment, component parts denoted with reference signs identical to those in the drawings relating to the first embodiment, and configurations that are not described, are similar to those in the first embodiment and produce similar functional effects. In the eighth embodiment, only portions different from those in the first embodiment will be described.

Figure 13:
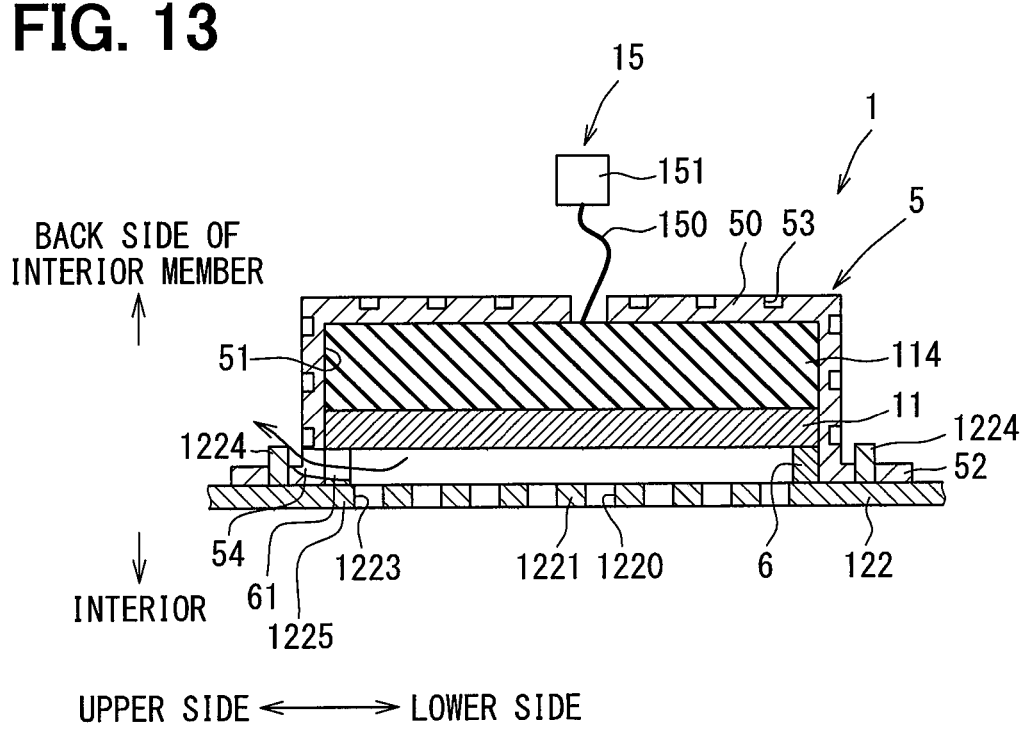
FIG. 13 is a sectional view illustrating the configuration of a radiation heater device in an eighth embodiment, and the relation between the radiation heater device and an interior member.

As shown in FIG. 13, in the heater device 1 in the eighth embodiment, a heater body is housed in a housing body (i.e., a first housing body) 5. In addition, holes in the form of meshes are formed in an interior member 122 such that the heater body faces a vehicle interior side. That is, part of the interior member 122 forms a guard member.

The heater device 1 in the eighth embodiment has the housing body 5 having a housing part 51 that houses the heater body so as to encircle the heater body. The housing body 5 is a bowl-shaped body that is open on the vehicle interior side. In the housing part 51 of the housing body 5, a heat insulation member (i.e., a first heat insulation member) 114 is arranged on a side adjacent to the ceiling portion 50, and a heat generating part 11 formed integrally with the heat insulation member 114 is arranged on a side adjacent to the flange part 52. The heat insulation member 114 can be formed from a material similar to that for the heat insulation member 14 in the seventh embodiment.

The flange part 52 of the housing body 5 is fixed to the interior member 122 by engaging with clip parts 1224 provided in the interior member 122. Each of the clip parts 1224 may have a form provided in the flange part 52. A spacer member 6 is interposed between the interior member 122 and the heat generating parts 11. The distance between the interior member 122 and the heat generating parts 11 is maintained by the spacer member 6. That is, the distance between the guard member and the heat generating parts 11 is maintained at a specified value.

It is preferable that the housing body 5 has recessed portions 53 that provide recessed portions and protruding portions in at least the external surface of the housing body 5. By having the recessed portions 53, the contact area of the housing body 5 with peripheral members can be made small. That is, it is able to contribute to prevention of heat radiation to the peripheral members from the housing body 5. Furthermore, it is preferable that the housing body 5 be made of a material with a large number of cavities. For example, the housing body 5 can be made of a foamable material. Accordingly, heat radiation to the outside from the housing body 5 can be reduced, thermal effect on peripheral components can also be reduced, and, for example, erroneous operation resulting from thermal effect can be prevented.

The interior member 122 has an opening 1223 that is open at a location corresponding to the heat generating parts 11. Inside the opening 1223, a grid 1221 and a large number of holes 1220 formed by the grid 1221 are provided, thereby forming a guard member. Since the grid 1221 is in the same plane as the surface of the interior member 122, the grid 1221 does not protrude from the interior member 122. Accordingly, the grid 1221 has an excellent appearance and does not suggest incongruity.

In addition, the heat generating parts 11 in the eighth embodiment may be replaced by a configuration in which the front surface layer 101, located on the vehicle interior side, and the heat generating parts 11 are integrated; or a configuration in which the front surface layer 101, the heat generating parts 11, and the rear surface layer 102 are integrated. The heat generating parts 11 in the eighth embodiment may be replaced by the heater body.

By forming the grid 1221 from a highly flexible raw material, the opening 1223 is stretchable outward to some extent when the heater device 1 is attached. Accordingly, workability in attaching the heater device 1 can be improved. Therefore, the heater device 1, excellent in mountability and attaching workability can be provided.

As described above, the heater case has the spacer member 6, the heat insulation member 114, and the housing body 5. The spacer member 6 is interposed between the interior member and the heater body such that the interior-side surface of the heater body is located on the back side of the interior member. The heat insulation member 114 is housed in the housing body 5 and supports the heater body together with the spacer member 6 on a condition that the heater body is located between the heat insulation member 114 and the spacer member 6. The spacer member 6, the heater body, and the heat insulation member 114 are accommodated in the housing body 5.

As shown in FIG. 13, in the spacer member 6, a through-hole 61 through which inside and outside of the spacer member 6 communicate with each other is provided in a location corresponding to the upper edge part 1225 of the interior member 122. Of the internally circumferential edge defining an opening 1223 in the interior member 122, the upper edge part 1225 is a part located in a relatively higher place.

The through-hole 61 is a passage that is located between the heater body and the interior and on the back side of the interior member 122 and that passes through the spacer member 6. Furthermore, in the housing body 5, a through-hole 54 is provided in a sidewall at a location corresponding to the through-hole 61 of the spacer member 6. The through-hole 54 forms a passage provided between the heater body and the interior and on the back side of the interior member 122 and continuous with the through-hole 61. Therefore, the through-hole 54 exhibits the function of a ventilation passage as with the through-hole 61. As described above, the housing body 5 has the through-hole 54 serving as a ventilation passage through which the space outside the housing body 5 located on the back side of the interior member 122 communicates with the interior-side surface of the heater body. Therefore, the ventilation passage, through which the space outside the heater case and the interior-side surface of the heater body communicate with each other, is a passage passing through the spacer member 6 and the housing body 5.

Air near the front surface of the heater body, heated by heat generated by the front surface of the heater body, easily flows upward by natural convection. Consequently, the air passes through the through-hole 61 and through-hole 54 located on the upper side, and flows onto the back side of the interior member 122. This decreases formation of a current of air heated by generation of the heater body and flowing in the interior along the interior member 122 after passing through the holes 1220. Thus, a series of passages formed from the through-hole 61 and through-hole 54 functions as a ventilation passage, through which air warmed by heat radiated from the front surface layer 101 of the heater body passes, and contributes to restricting air flowing in the interior along the interior member 122. The function of the continuous ventilation passage formed from the through-hole 61 and through-hole 54 is able to reduce uneven upward heat radiation during heating by the heater device, and restrict temperature rise in the interior-side surface of the interior member.

Ninth Embodiment

A ninth embodiment will be described with reference to FIG. 14. In the ninth embodiment, component parts denoted with reference signs identical to those in the drawings relating to the first embodiment and configurations that are not described are identical to those in the first embodiment and produce similar functional effects. In the ninth embodiment, only portions different from those in the first embodiment will be described.

Figure 14:
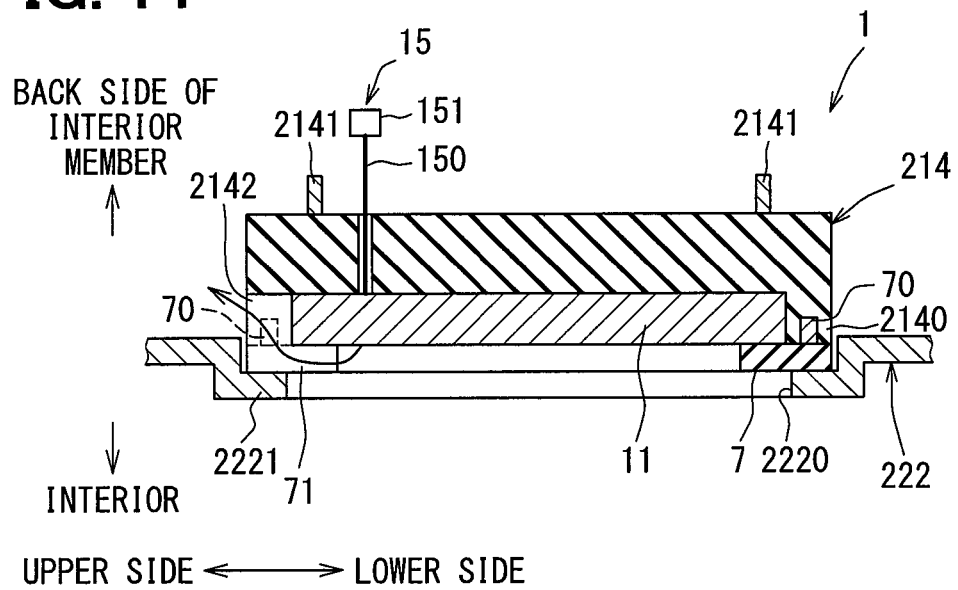
FIG. 14 is a sectional view illustrating the configuration of a radiation heater device in a ninth embodiment, and the relation between the radiation heater device and an interior member.

As shown in FIG. 14, in the heater device 1 in the ninth embodiment, the heater body is housed in a heater case formed of a heat insulation member (i.e., a second heat insulation member) 214 and a lid member 7. The heater device 1 in the ninth embodiment has the lid member 7, which is a first case section provided in an interior member 222 side with respect to a heater body, and the heat insulation member 214 that is a second case section provided on the back side of the heater body. Therefore, the heater body is interposed and supported between the first case section and the second case section.

The heat insulation member 214 and the lid member 7 are made of a material such as a foamable material, urethane resin, or a rubber material. Each of these members is formed from a material that has a higher heat insulation performance than the heat generating part 11 and a front surface layer 101.

The heat insulation member 214 has clip parts 2141 protruding from a top surface opposite to a vehicle interior. The clip parts 2141 are respectively engaged with the engagement holes of a mating component when a vehicle-side member and the heat insulation member 214 are fixed. The clip parts 2141 are made of another material greater in strength than the heat insulation member 214. For example, the heat insulation member 214 and the clip parts 2141 are formed by two-color molding. The clip parts 2141 may be connected integrally with the heat insulation member 214 by adhesion.

The lid member 7 has clip parts 70 protruding from the surface opposite to the vehicle interior. The clip parts 70 are respectively engaged with the engagement holes 2140 of the insulation member 214 when the lid member 7 and the heat insulation member 214 are integrally engaged. The clip parts 70 are made of another material greater in strength than the lid member 7. For example, the lid member 7 and the clip parts 70 are formed by two-color molding. The clip parts 70 may be connected integrally with the lid member 7 by adhesion.

An opening 2220 with the area of an opening in which the heater device 1 can be mounted is provided in the interior member 222. The heat insulation member 214 and lid member 7 support the heat generating part 11 that is interposed therebetween, and are placed and fixed on the inner edge of the opening 2220. As shown in FIG. 6, the heater device 1 is provided so as to be located on the back side of the opening 2220.

In addition, the heat generating part 11 in the ninth embodiment may be replaced by a configuration in which the front surface layer 101, located on the vehicle interior side, and the heat generating part 11 are integrated, or a configuration in which the front surface layer 101, the heat generating part 11, and the rear surface layer 102 are integrated. The heat generating part 11 in the ninth embodiment can be replaced by the heater body.

As shown in FIG. 14, in the lid member 7, a through-hole 71 through which inside and outside of the lid member 7 communicate with each other is provided at a location corresponding to the upper edge part 2221 of the interior member 222. Of the internally circumferential edge defining the opening 2220 in the interior member 222, the upper edge part 2221 is a part located in a relatively higher place.

The through-hole 71 is a passage that is located between the heater body and the interior and on the back side of the interior member 222 and that passes through the lid member 7. Furthermore, in the heat insulation member 214, a through-hole 2142 is provided in a sidewall at a location corresponding to the through-hole 71 of the lid member 7. The through-hole 2142 is provided on the back side of the interior member 222, and forms a passage continuous with the through-hole 71. Therefore, the through-hole 2142 exhibits the function of a ventilation passage as with the through-hole 71. As described above, the heat insulation member 214 and lid member 7 forming the heater case have the through-hole 2142 and through-hole 71 serving as ventilation passages through which the space outside the heater case located on the back side of the interior member 122 communicates with the interior-side surface of the heater body.

As described above, the heater case has the heat insulation member 214 and the lid member 7. The heat insulation member 214 has a recessed portion for housing the heater body and is made of a material with heat insulation properties. The lid member 7 is provided on the interior side of the heater body to support the heater body together with the heat insulation member 214 on a condition that the heater body is interposed between the lid member 7 and the heat insulation member 214. The lid member 7 is made of a material having a heat insulation property. The ventilation passage, through which the space outside the heater case communicates with the interior-side surface of the heater body, is a passage passing through the heat insulation member 214 and lid member 7.

Air near the front surface of the heater body, heated by heat generated by the front surface of the heater body, is liable to flow upward by natural convection. Consequently, the air passes through the through-hole 71 and through-hole 2142 located on the upper side, and flows onto the back side of the interior member 222. This decreases formation of a current of air heated by generation of the heater body and flowing in the interior along the interior member 222 after passing through the openings 2220. As described above, a series of passages formed from the through-hole 71 and through-hole 2142 functions as a ventilation passage, through which air warmed by heat radiated from the front surface layer 101 of the heater body passes, and contributes to restricting air flowing in the interior along the interior member 222. The function of the continuous ventilation passage formed from the through-hole 71 and through-hole 2142 is able to reduce uneven upward heat radiation during heating by the heater device, and restrict temperature rise in the interior-side surface of the interior member.

Tenth Embodiment

A tenth embodiment will be described with reference to FIG. 15. In the tenth embodiment, component parts denoted with reference signs identical to those in the drawings relating to the first embodiment, and configurations that are not described are similar to those in the first embodiment and produce similar functional effects. In the tenth embodiment, only portions different from those in the first embodiment will be described.

Figure 15:
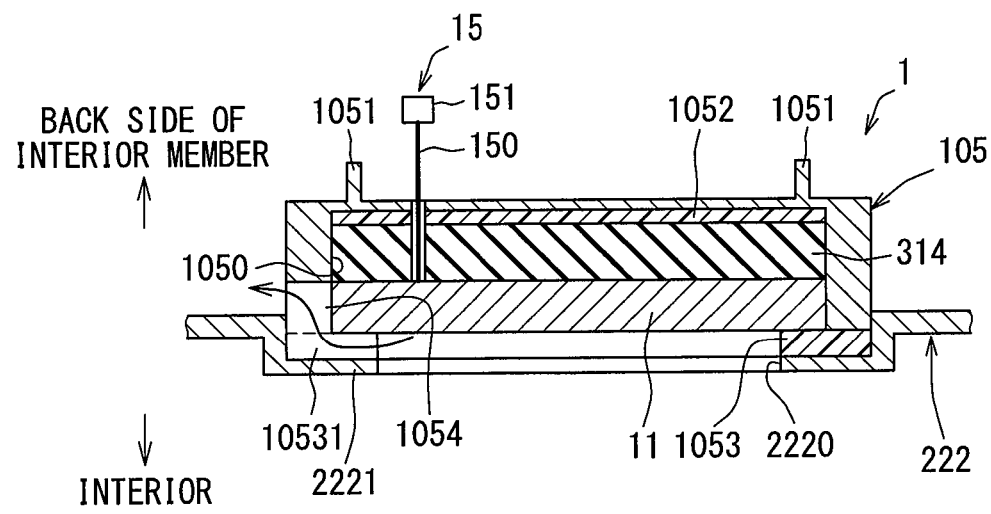
FIG. 15 is a sectional view illustrating the configuration of a radiation heater device in a tenth embodiment, and the relation between the radiation heater device and an interior member.

As shown in FIG. 15, in the heater device 1 in the tenth embodiment, a heater body is housed in a housing body (second housing body) 105 that has a front-side support part 1053 and a back-side support part 1052. The housing body 105 is a bowl-shaped body that is open on a vehicle interior side. The bowl-shaped housing body 105 has a housing part 1050. The housing body 105 has the back-side support part 1052 with a rectangular shape on a ceiling portion side, and also has the front-side support part 1053 with a frame shape at a location a specified length downward from the back-side support part 1052.

In the housing part 1050, a heat insulation member (i.e., a third heat insulation member) 314 is arranged on a side adjacent to the ceiling portion, and a heat generating part 11 formed integrally with the heat insulation member 314 is arranged on a side adjacent to the front-side support part 1053. The heat insulation member 314 can be made of a material similar to that for the heat insulation member 14 in the seventh embodiment. The heat generating part 11 in the tenth embodiment can also be replaced by a heater body.

The front-side support part 1053 and the back-side support part 1052 are made of an elastic material such as elastomer. Each of the members is made of a material greater in heat insulation properties than those for the heat generating part 11 and a front surface layer 101. For example, the housing body 105 is formed integrally with the front-side support part 1053 and the back-side support part 1052 by two-color molding. The front-side support part 1053 and the back-side support part 1052 may be connected integrally with the housing body 105 by adhesion.

Clip parts 1051 that protrude from a top surface opposite to the vehicle interior are provided in the housing body 105. The clip parts 1051 are respectively engaged with the engagement holes of a mating component when a vehicle-side member and the housing body 105 are fixed. The clip parts 1051 and the housing body 105 are made of a resin material of high strength. The housing body 105 is placed and fixed on the inner edges of an opening 2220. As shown in FIG. 15, the heater device 1 is located on the back side of the opening 2220.

As shown in FIG. 15, in the front-side support part 1053, a through-hole 10531, through which an inside and an outside of the front-side support part 1053 communicate with each other, is provided at a location corresponding to an upper edge part 2221 of an interior member 222.

The through-hole 10531 is a passage that is located between the heater body and the interior and on the back side of the interior member 222 and that passes through the front-side support part 1053. Furthermore, in the housing body 105, a through-hole 1054 is provided in a sidewall at a location corresponding to the through-hole 10531 of the front-side support part 1053. The through-hole 1054 is provided on the back side of the interior member 222, and forms a passage continuous with the through-hole 10531. Therefore, the through-hole 1054 exhibits the function of a ventilation passage as with the through-hole 10531. As described above, the housing body 105 and the front-side support part 1053 have the through-hole 1054 and through-hole 10531 serving as a ventilation passage through which a space outside a heater case located on the back side of the interior member 222 communicates with an interior-side surface of the heater body.

As described above, the heater case has the front-side support part 1053, the heat insulation member 314, the back-side support part 1052, and the housing body 105. The front-side support part 1053 is made of an elastic material, and is interposed between the interior member and the heater body such that the interior-side surface of the heater body is located on the back side of the interior member. The heat insulation member 314 supports the heater body together with the front-side support part 1053 on a condition that the heater body is interposed between the heat insulation member 314 and the front-side support part 1053. The back-side support part 1052 is made of an elastic material, and supports the heat insulation member 314 on the back side of the heat insulation member 314. The housing body 105 houses the heater body, the heat insulation member 314, and the back-side support part 1052 in that order from the interior side to the depth side. The front-side support part 1053 is in contact with the interior-side end face of the housing body 105, and is not housed in the housing body 105. The ventilation passage, through which the space outside the heater case and the interior-side surface of the heater body communicate with each other, is a passage that passes through the front-side support part 1053 and housing body 105.

Air near the front surface of the heater body, heated by heat generated by the front surface of the heater body, is liable to flow upward by natural convection. Consequently, the air passes through the through-hole 10531 and through-hole 1054 located on the upper side and flows on the back side of the interior member 222. This reduces formation of a current of air heated by generation by the heater body flowing in the interior along the interior member 222 after passing through the opening 2220. Thus, a series of passages formed from the through-hole 10531 and through-hole 1054 functions as a ventilation passage, through which air warmed by heat radiated from the front surface layer 101 of the heater body passes, and contribute to restricting an air current flowing in the interior along the interior member 222. The function of the ventilation passage that is continuous by the through-hole 10531 and through-hole 1054 is able to reduce uneven upward heat radiation during heating by the heater device, and prevent temperature rise in the interior-side surface of the interior member.

In addition, the housing body 105 has the front-side support part (first elastic part) 1053 and the back-side support part (second elastic part) 1052. The front-side support part 1053 is in contact with the vehicle interior-side outer edge part of the heater body. The back-side support part 1052 is in contact with almost the entire surface of the heater body, which entire surface is opposite the vehicle interior. The heater body is interposed and supported between the first and second elastic parts.

According to the configuration, in the housing body 105, elastic parts are provided in portions in contact with the heater body on both upper and lower sides. The elastic parts on both the upper and lower sides are elastically deformed upon receiving load. Therefore, when the heater body is housed in the housing body 105, the supporting portions of the elastic parts can be deformed easily. Thus, workability in attaching the heater body to the housing body 105 can be improved. Therefore, the radiation heater device 1 excellent in mountability and attaching workability can be provided.

Eleventh Embodiment

Figure 16:
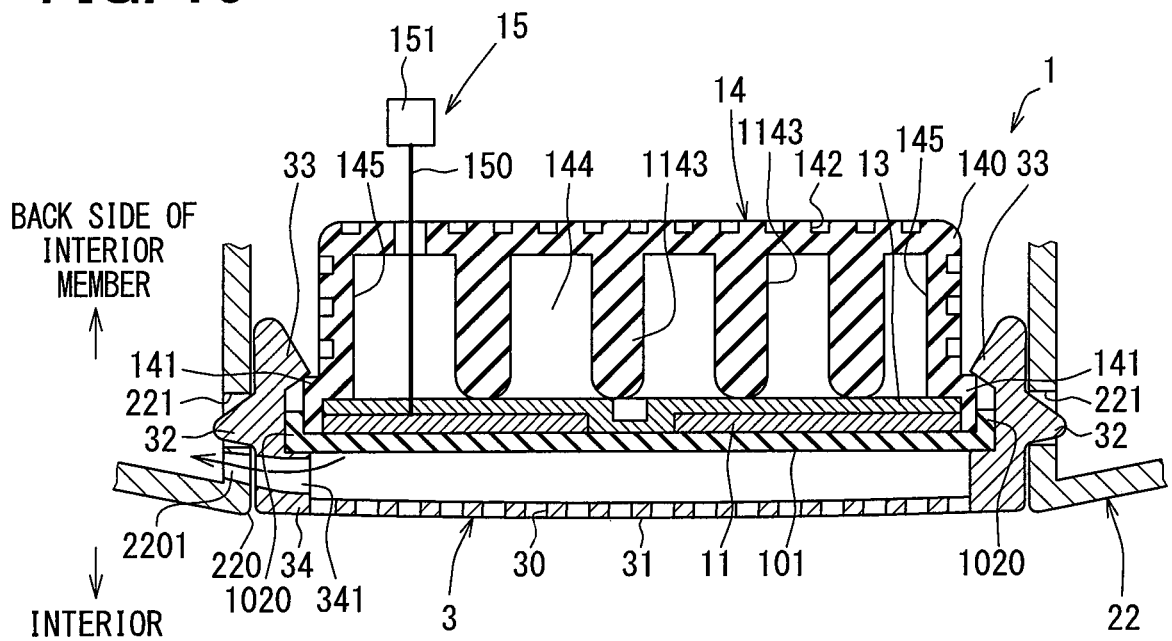
FIG. 16 is a sectional view illustrating the configuration of a radiation heater device in an eleventh embodiment, and the relation between the radiation heater device and an interior member.

An eleventh embodiment will be described with reference to FIG. 16. In the eleventh embodiment, component parts denoted with reference signs identical to those in the drawings relating to the seventh embodiment, and configurations that are not described are similar to those in the seventh embodiment and produce similar functional effects. In the eleventh embodiment, only portions different from those in the seventh embodiment will be described.

The heat insulation member 14 in the eleventh embodiment differs from the heat insulation member 14 in the seventh embodiment in configuration of a columnar portion 1143. The columnar portion 1143 has a tip that is in contact with an aluminum film 13, and the tip is provided with a curved surface. The tip of the columnar portion 1143 thereby has a tapered shape. Therefore, according to the seventh embodiment, a contact area of the columnar portion 1143 being in contact with the aluminum film 13 is smaller than that of the columnar portion 143. Thus, according to the eleventh embodiment, the amount of heat radiation transmitted from a heater body to the heat insulation member 14 can be restricted.

Twelfth Embodiment

Figure 17:
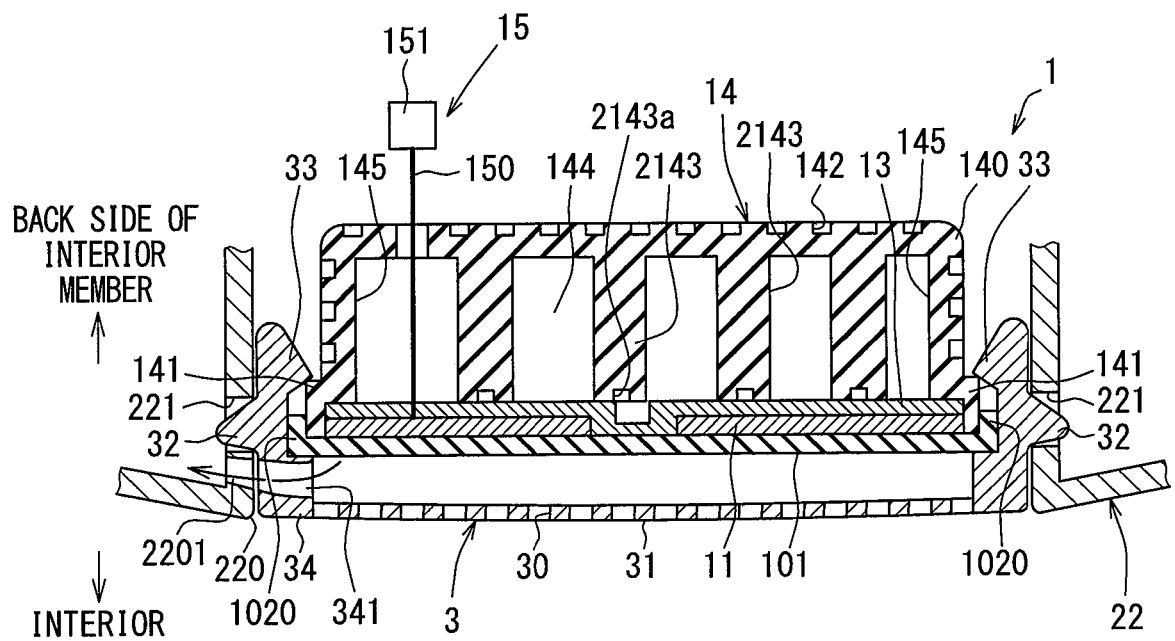
FIG. 17 is a sectional view illustrating the configuration of a radiation heater device in a twelfth embodiment, and the relation between the radiation heater device and an interior member.

A twelfth embodiment will be described with reference to FIG. 17. In the twelfth embodiment, component parts denoted with reference signs identical to those in the drawings relating to the seventh embodiment, and configurations that are not described are similar to those in the seventh embodiment and produce similar functional effects. In the twelfth embodiment, only portions different from those in the seventh embodiment will be described.

The heat insulation member 14 in the twelfth embodiment differs from the heat insulation member 14 in the seventh embodiment in configuration of a columnar portion 2143. In the columnar portion 2143, a recessed portion 2143a is formed in its leading-end portion that is in contact with an aluminum film 13. The columnar portion 2143 is in contact with the aluminum film 13 on its end face formed around the recessed portion 2143a. Therefore, a heat insulation space surrounded by the recessed portion 2143a and the aluminum film 13 is defined between the columnar portion 2143 and the aluminum film 13. Since air is present in the insulation space, the heat insulation space can be the air chamber described above. The amount of heat radiation transmitted from a heater body to the heat insulation member 14 can be restricted by the insulation space.

The columnar portion 2143 is smaller in contact area with the aluminum film 13 than the columnar portion 143 in the seventh embodiment. According to the twelfth embodiment, the amount of heat radiation transmitted from a heater body to the heat insulation member 14 can be restricted.

Thirteenth Embodiment

Figure 18:
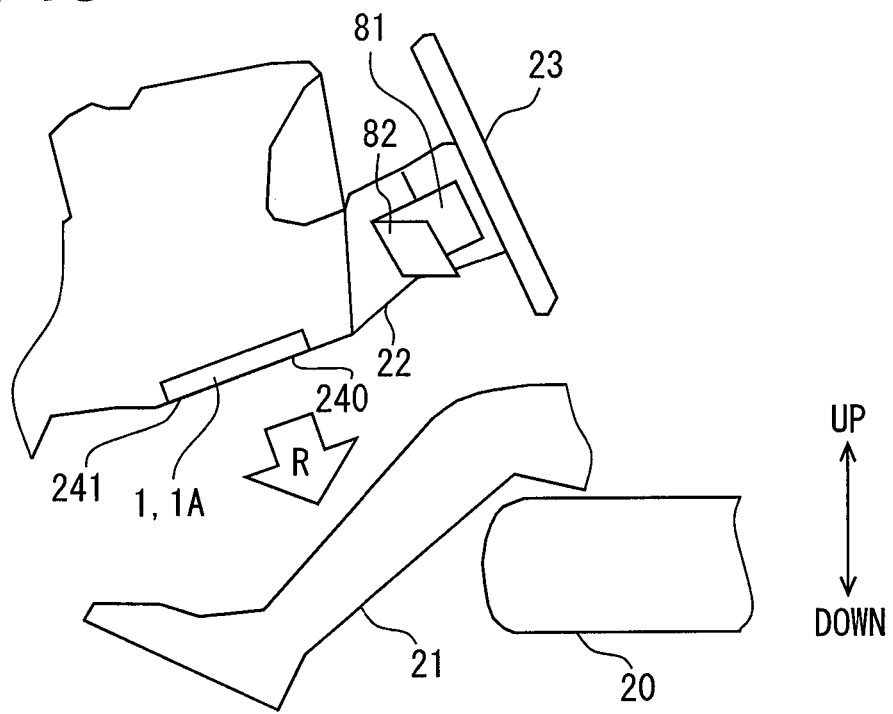
FIG. 18 is a diagram illustrating the positional relation between a heating device according to a thirteenth embodiment and an occupant.
Figure 19:
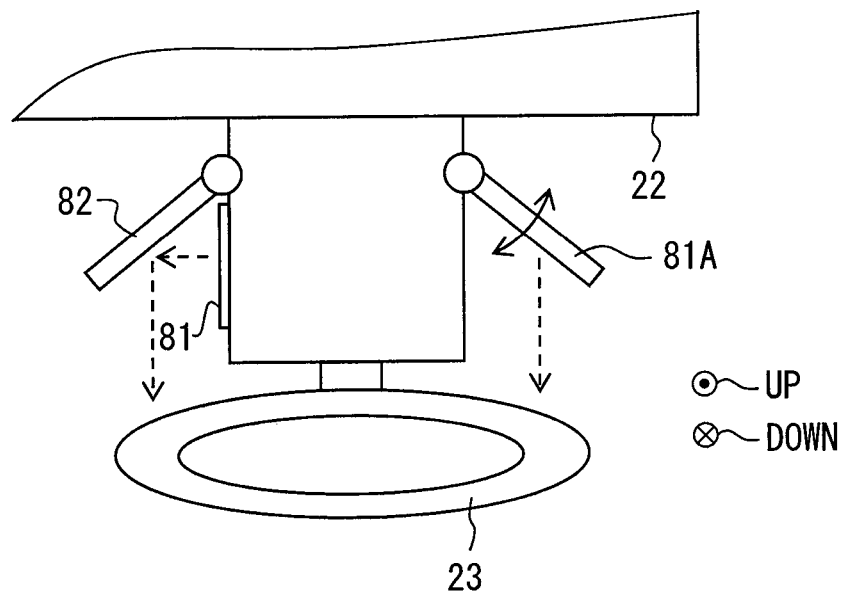
FIG. 19 is a diagram illustrating the configuration of a heat generating apparatus and a reflecting plate that are included the heating device in the thirteenth embodiment.

A thirteenth embodiment will be described with reference to FIGS. 18, 19. In the thirteenth embodiment, component parts denoted with reference signs identical to those in the drawings relating to the first embodiment, and configurations that are not described are similar to those in the first embodiment and produce similar functional effects. In the thirteenth embodiment, only portions different from those in the first embodiment will be described.

In a heating device in the thirteenth embodiment, in order to make occupant's upper body warm, an additional heater device 81 is provided for each of the foregoing embodiments. The heater device 81 is disposed to a component or an interior member located around a steering wheel, and has a heat generating element that generates heat toward outside.

The heater device 81 has the same configuration as that of each heater device 1, 1A described above.

The heating device in the thirteenth embodiment has a reflecting plate 82 that reflects radiant heat radiated from the heater device 81, toward occupant's hands. The heater device 81 in this case is a radiant-heat heater device, which radiates radiant heat. Alternatively, the reflecting plate 82 may have an angle-changing drive part that is able to change the angle of the surface of the reflecting plate 82 so as to change its reflecting direction. Additionally, as shown in FIG. 19, the heating device in the thirteenth embodiment may have a heater device 81A that is able to change the angle of a radiation surface that radiates radiant heat. The heater device 81A has an angle-changing drive part that is able to change a surface angle so as to change the angle of the heat radiation surface.

The thirteenth embodiment is able to provide the heating device that makes up for insufficient heating, which results from a decrease in natural convection toward occupant's hands due to each of the foregoing embodiments.

Fourteenth Embodiment

Figure 20:
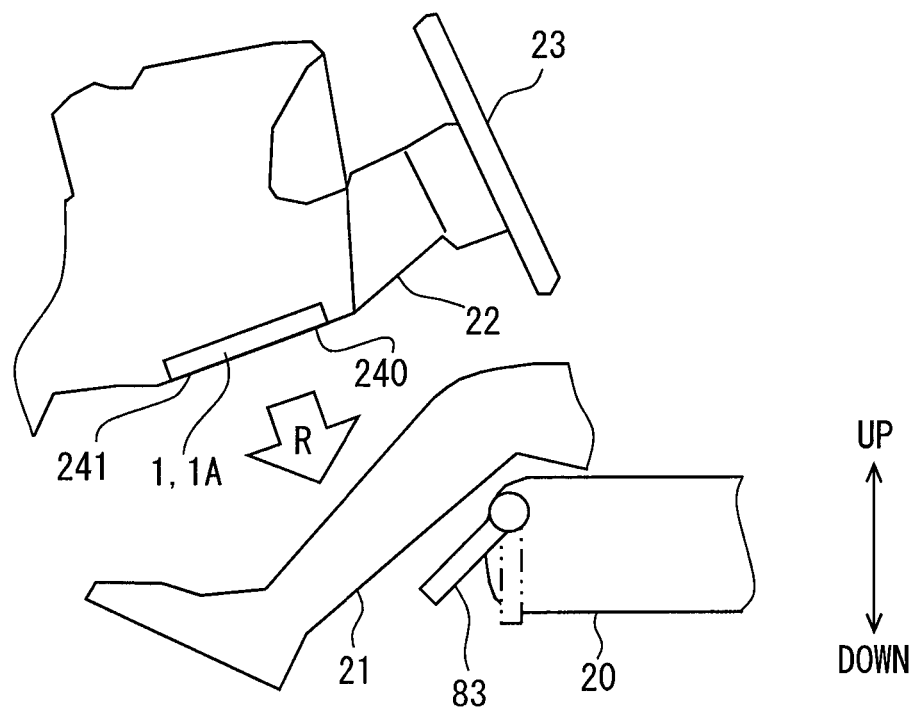
FIG. 20 is a diagram illustrating the positional relation between a heating device according to a fourteenth embodiment and an occupant.

A fourteenth embodiment will be described with reference to FIG. 20. In the fourteenth embodiment, component parts denoted with reference signs identical to those in the drawings relating to the first embodiment, and configurations that are not described are similar to those in the first embodiment and produce similar functional effects. In the fourteenth embodiment, only portions different from those in the first embodiment will be described.

In a heating device in the fourteenth embodiment, in order to make occupant's feet warm, an additional heater device 83 is provided for each of the foregoing embodiments. The heater device 83 is disposed to a seat or an interior member located around occupant's feet, and has a heat generating element that generates heat toward outside. The heater device 83 has the same configuration as that of each heater device 1, 1A described above.

The heating device in the fourteenth embodiment has a reflecting plate that reflects radiant heat radiated from the heater device 83, toward occupant's foot. The heater device 83 in this case is a radiant-heat heater device, which radiates radiant heat. Alternatively, the reflecting plate may have an angle-changing drive part that is able to change the angle of the surface of the reflecting plate so as to change its reflecting direction. Additionally, the heater device 83 is able to change the angle of a radiation surface that radiates radiant heat. The heater device 83 in this case has an angle-changing drive part that is able to change a surface angle so as to change the angle of the heat radiation surface.

The fourteenth embodiment is able to provide the heating device that makes up for insufficient heating, which results from a decrease in natural convection toward occupant's feet due to each of the foregoing embodiments.

(Other Modifications)

While the present disclosure has been described with reference to preferred embodiments thereof, it is to be understood that the disclosure is not limited to the preferred embodiments and constructions. The present disclosure is intended to cover various modification and equivalent arrangements within a scope of the present disclosure. It should be understood that structures described in the above-described embodiments are preferred structures, and the present disclosure is not limited to have the preferred structures. The present disclosure is intended to cover various modifications and equivalent arrangements within the scope of the present disclosure.

The heating device in the fourteenth embodiment may be combined with the device in the thirteenth embodiment. This makes it possible to provide a heating device that makes up for insufficient heating, which results from a decrease in natural convection toward occupant's hands and feet due to each of the foregoing embodiments from the first to twelfth embodiments.

The heater body in each of the foregoing embodiments may be provided with a specific range within which the heat generating part 11 is not present. This makes it possible to easily bend the heater body within the specific range. This also makes it possible to improve workability in attaching the heater body and to dispose the heater body on a condition of being bent.

What is claimed is:

1. A heating device comprising:
    a heater body that has a heat generating part and an interior-side surface, the heat generating part being configured to generate heat, the heater body being configured to radiate the heat from the interior-side surface; and
    a heater case that is attached to an interior member, which is provided in an interior, from a back side of the interior member and that houses the heater body, wherein
    the interior member defines a rear space on the back side that is separated from the interior, and the heater case is positioned in the rear space,
    the heater case is provided with a ventilation passage that is formed between the interior member and the interior-side surface of the heater body,
    the rear space and an inside of the heater case are in communication with each other through the ventilation passage,
    the heater case allowing a warm air, which is heated by the heat radiated from the interior-side surface, to flow out of a side surface of the heater case from the ventilation passage into the rear space,
    the interior-side surface of the heater body is below an interior opening which is adjacent to the interior member, faces the interior and communicates with an inner space of an air conditioning case of a vehicle air conditioner through an aspirator hose to draw air from the interior into the inner space of the air conditioning case, and
    an interior temperature sensor is disposed above the heater case and detects a temperature of the air drawn into the aspirator hose.

2. The heating device according to claim 1, wherein
    the heater body is housed in the heater case such that one end of the heater body is located above the other end of the heater body, and
    the ventilation passage is provided in the heater case on a side adjacent to the one end.

3. The heating device according to claim 1, wherein
    the heater body is housed in the heater case such that the interior-side surface is arranged horizontally, and
    the ventilation passage configures a passage that passes through the side surface of the heater case.

4. The heating device according to claim 1, wherein
    the interior member has a sidewall that covers an outer side of the heater case and is provided with a through-hole corresponding to the ventilation passage.

5. The heating device according to claim 1, wherein the heater case has
   a spacer member that is interposed between the interior member and the heater body such that the interior-side surface of the heater body is located on the back side of the interior member,
   a first heat insulation member that supports the heater body together with the spacer member, and
   a first housing body that therein houses the spacer member, the heater body, and the first heat insulation member, and
the ventilation passage passes through the spacer member and the first housing body.

6. The heating device according to claim 1, wherein the heater case has
   a second heat insulation member that has a recessed portion housing the heater body and that is made of a material having a heat insulation property, and
   a lid member that is provided on an interior side of the heater body and supports the heater body, which is located between the lid member and the second heat insulation member, together with the second heat insulation member, the lid member that is made of a material having a heat insulation property, and
the ventilation passage is a passage that passes through the second heat insulation member and the lid member.

7. The heating device according to claim 1, wherein the heater case has
   a front-side support part that is made of an elastic material and is interposed between the interior member and the heater body such that the interior-side surface of the heater body is located on the back side of the interior member,
   a third heat insulation member that supports the heater body together with the front-side support part on a condition that the heater body is interposed between the front-side support part and the third heat insulation member,
   a back-side support part that is made of an elastic material and supports the third heat insulation member on a back side of the third heat insulation member, and
   a second housing body that houses the heater body, the third heat insulation member, and the back-side support part in that order from an interior side, and
the ventilation passage is a passage that passes through the front-side support part and the second housing body.

8. The heating device according to claim 1, wherein the heater body supplies, as radiant heat, heat radiated from the heat generating part when being energized.

9. The heating device according to claim 1, wherein the heater body has the heat generating part provided with a hot water passage in which warm water flows, and supplies heat radiated from the hot water passage.

10. The heating device according to claim 1, wherein the interior member is provided in the interior of a vehicle.

11. The heating device according to claim 1, wherein the interior member is arranged on an undersurface of a steering column provided in the interior of a vehicle.

12. The heating device according to claim 1, wherein the interior member is arranged on an instrument panel provided in the interior of a vehicle.

13. The heating device according to claim 1, wherein the interior member is arranged on a door trim provided in the interior of a vehicle.

14. The heating device according to claim 1, wherein the ventilation passage is provided over an entire length of the heater case in a longitudinal direction of the heater case so as to correspond to a width of the heater body.

15. The heating device according to claim 1, wherein the rear space and the inside of the heater case are in direct communication with each other through the ventilation passage.

* * * * *